US012750830B2

(12) United States Patent
Reddy

(10) Patent No.: US 12,750,830 B2
(45) Date of Patent: Sep. 29, 2026

(54) SECURITY VULNERABILITY DETECTION AND PREVENTION FOR WIRELESS POSITIONING

(71) Applicant: QUALCOMM Incorporated, San Diego, CA (US)

(72) Inventor: Varun Amar Reddy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 18/492,711

(22) Filed: Oct. 23, 2023

(65) Prior Publication Data

US 2025/0133548 A1 Apr. 24, 2025

(51) Int. Cl.

| | |
|---|---|
| ***H04W 72/04*** | (2023.01) |
| ***H04W 72/0453*** | (2023.01) |
| ***H04W 72/20*** | (2023.01) |
| ***H04W 76/00*** | (2018.01) |
| ***H04W 88/08*** | (2009.01) |

(52) U.S. Cl.

CPC ....... *H04W 72/0453* (2013.01); *H04W 72/20* (2023.01)

(58) Field of Classification Search

None

See application file for complete search history.

(56) References Cited

U.S. PATENT DOCUMENTS

2022/0239532 A1 7/2022 Niewczas et al.
2022/0321388 A1 10/2022 Keating et al.
2024/0014851 A1* 1/2024 So .......................... H04W 4/70

FOREIGN PATENT DOCUMENTS

GB 2600549 A * 5/2022 .......... H04W 12/122

OTHER PUBLICATIONS

Anliker C., et al., "Time for Change: How Clocks Break UWB Secure Ranging", USENIX, The Advanced Computing Systems Association, Aug. 15, 2023, pp. 19-36, XP061082682, 19 Pages, Section 4.5.1.

International Search Report and Written Opinion—PCT/US2024/048023—ISA/EPO—Jan. 15, 2025.

(Continued)

*Primary Examiner* — Maharishi V Khirodhar

(74) *Attorney, Agent, or Firm* — Procopio, Cory, Hargreaves & Savitch LLP

(57) ABSTRACT

A first user equipment (UE) may transmit a first ranging message. A second UE may receive the first ranging message. The second UE may calculate a carrier frequency offset (CFO) based on the ranging message. The second UE may transmit a response message comprising control information to modify a transmission protocol. The transmission of the response message may be in response to the calculated CFO being greater than or equal to a threshold value. The calculated CFO may indicate a possible security vulnerability between the first UE and the second UE. The first UE may receive the response message including control information to modify the transmission protocol after the transmission of the first ranging message. The first UE may then transmit a second ranging message based on the control information. The second ranging message may prevent, or mitigate, the detected possible security vulnerability.

28 Claims, 22 Drawing Sheets

(56) References Cited

OTHER PUBLICATIONS

Sun Y(Qualcomm)., et al., "11bk Spec text for NDP Announcement", IEEE Draft, doc: IEEE 802.11-23/03904r4, 11-23-0390-04-00BK-NDP-Announcement, IEEE-SA Mentor, Piscataway, NJ USA, vol. 802.11bk, No. 4, Apr. 24, 2023, 19 Pages, XP068202309, p. 12.

* cited by examiner

SECURITY VULNERABILITY DETECTION AND PREVENTION FOR WIRELESS POSITIONING

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may receive a ranging message. The apparatus may calculate a carrier frequency offset (CFO) based on the ranging message. The apparatus may transmit a response message including control information to modify a transmission protocol. The transmission of the response message may be in response to the calculated CFO being greater than or equal to a threshold value.

In an aspect of the disclosure, a method, a computer-readable medium, and an apparatus are provided. The apparatus may include a UE. The apparatus may transmit a first ranging message. The apparatus may receive a response message including control information to modify a transmission protocol after the transmission of the first ranging message. The apparatus may transmit a second ranging message based on the control information.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
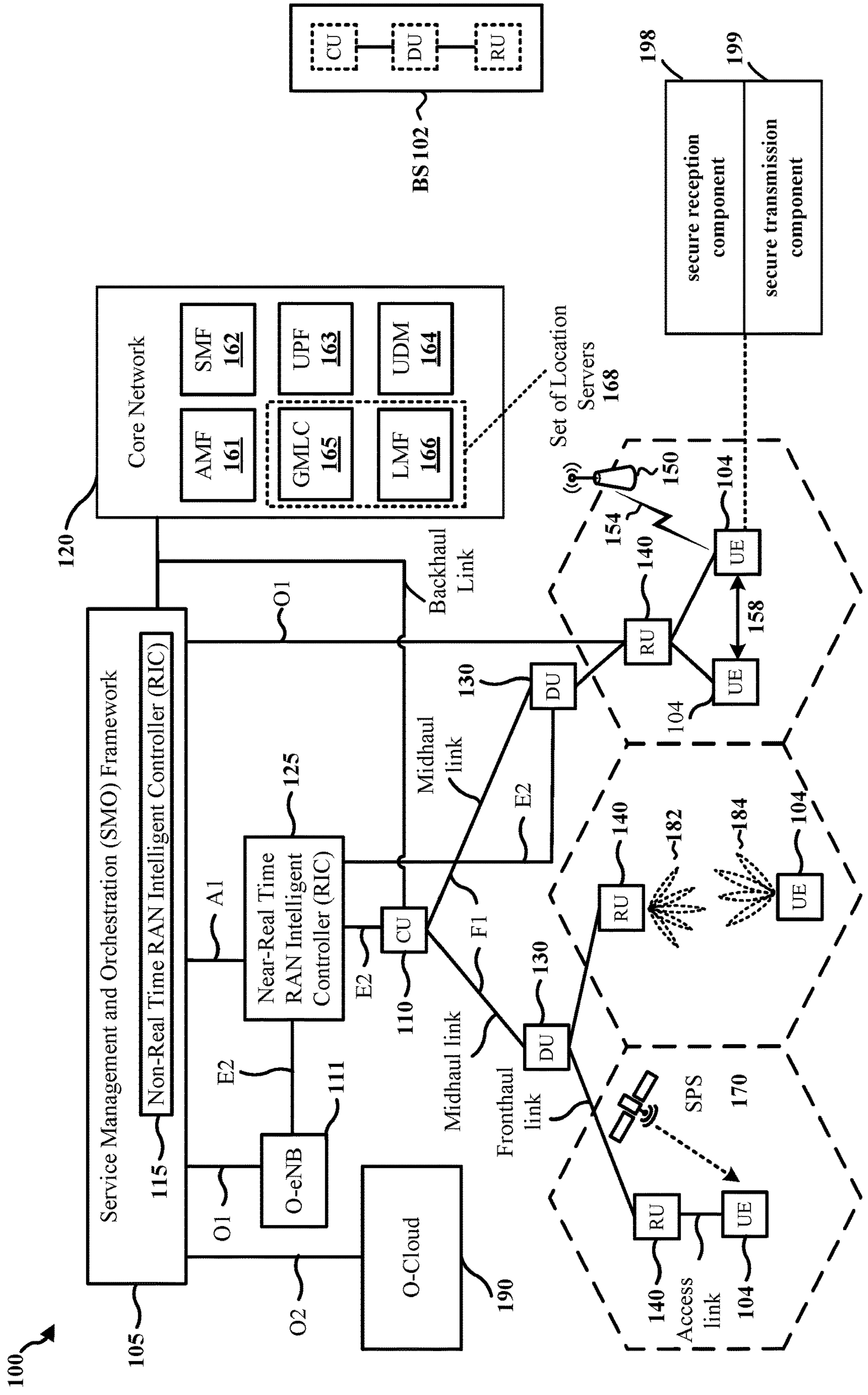
FIG. 1 is a diagram illustrating an example of a wireless communications system and an access network.

The following description is directed to examples for the purposes of describing innovative aspects of this disclosure. However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 1402.11 standards, the IEEE 1402.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to wireless positioning systems. Some aspects more specifically relate to detecting and mitigating security vulnerabilities between ranging devices for a wireless positioning system. In some examples, a first user equipment (UE) may transmit a first ranging message. A second UE may receive the first ranging message. The second UE may calculate a carrier frequency offset (CFO) based on the ranging message. The second UE may transmit a response message including control information to modify a transmission protocol. The transmission of the response message may be in response to the calculated CFO being greater than or equal to a threshold value. The calculated CFO may indicate a possible security vulnerability between the first UE and the second UE. The first UE may receive the response message including control information to modify the transmission protocol after the transmission of the first ranging message. The first UE may then transmit a second ranging message based on the control information. The second ranging message may prevent, or mitigate, the detected possible security vulnerability by modifying which ranging messages the second UE processes based on the control information.

In some aspects, the control message may mitigate mix-down (MD) manipulation security vulnerabilities between wireless devices performing positioning, or ranging, with one another. In some aspects, a first UE (e.g., an initiator) may estimate a clock frequency offset (CFO) of ranging messages (e.g., a ranging initiation message (RIM), a ranging response message (RRM)) and may observe when the CFO may be greater than, or equal to, a threshold. The first UE may send a response message (e.g., a ranging control update message (RCUM)) to a second UE (e.g., a responder) in response to the observation. The response message may include one or more frequency offsets. The frequency offsets may include distinct frequency offsets associated with each preamble symbol of a set of preamble symbols. The second UE may (a) transmit a ranging message (e.g., an RRM) at the frequency offset included in the response message, (b) transmit the ranging message with a distinct frequency offset for each of the preamble symbols of the ranging message. In some aspects, the first UE may use the threshold to discard, ignore, and/or skip a portion of a preamble with the CFO that is greater than, or equal to, the threshold. In other words, the first UE may assume that such preambles are affected by spoofing stretch and advance (SA) manipulation. In some aspects, a UE (e.g., a responder, an initiator) may estimate a CFO based on a narrowband (NB) packet, and may determine when the CFO is greater than, or equal to, the threshold value. The UE that determines when the CFO is greater than, or equal to, the threshold value may transmit an indicator (e.g., a control message) to the entity transmitting the ranging message with additional control information that may be used to modify one or more upcoming transmissions. Such an entity may transmit a synchronization portion (SYNC) of a packet with a distinct code index for each subset of one or more corresponding preamble symbols. The code index information may be included in the additional control information.

Particular aspects of the subject matter described in this disclosure can be implemented to realize one or more of the following potential advantages. In some examples, by monitoring when the CFO of a ranging message is greater than or equal to a threshold, the described techniques can be used to indicate to a transmitting device when a security vulnerability is detected (e.g., an MD manipulation against single-sided (SS) two-way ranging (SS-TWR) or SA manipulation against narrow-band assistance (NBA) multi-millisecond (NBA-MMS) ranging. The indicator may include control information, for example an RCUM may be transmitted that includes control information. The transmitting device may then use the control information to modify transmissions of one or more future ranging messages to minimize the effects of the detected security vulnerabilities.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 1402.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a secure reception component 198 that may be configured to receive a ranging message. The secure reception component 198 may be configured to calculate a CFO based on the ranging message. The secure reception component 198 may be configured to transmit a response message including control information to modify a transmission protocol. The transmission of the response message may be in response to the calculated CFO being greater than or equal to a threshold value. In certain aspects, the base station 102 may have a secure transmission component 199 that may be configured to transmit a first ranging message. The secure transmission component 199 may be configured to receive a response message including control information to modify a transmission protocol after the transmission of the first ranging message. The secure transmission component 199 may be configured to transmit a second ranging message based on the control information.

Figures 2A, 2B, 2C, 2D:
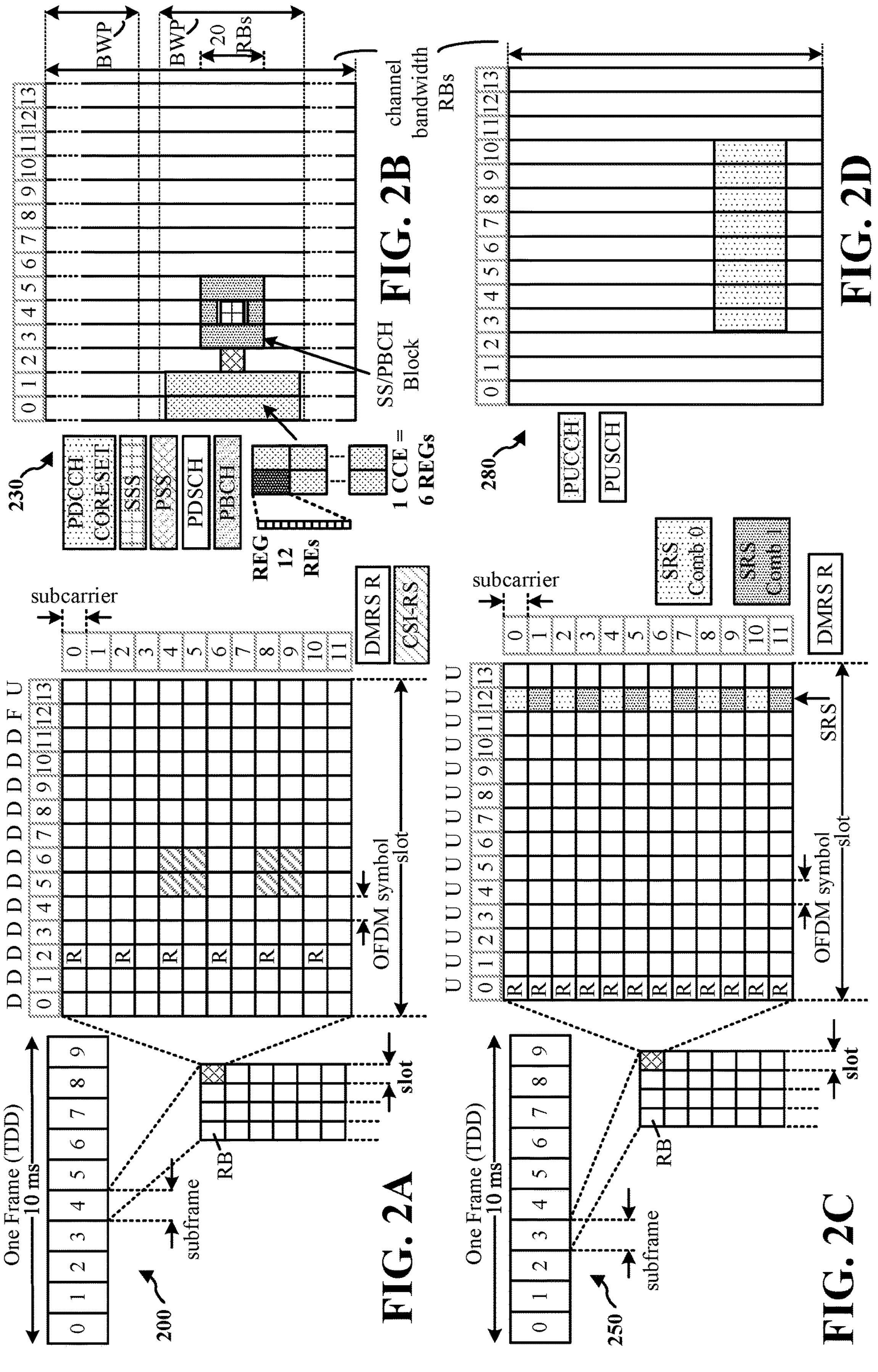
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
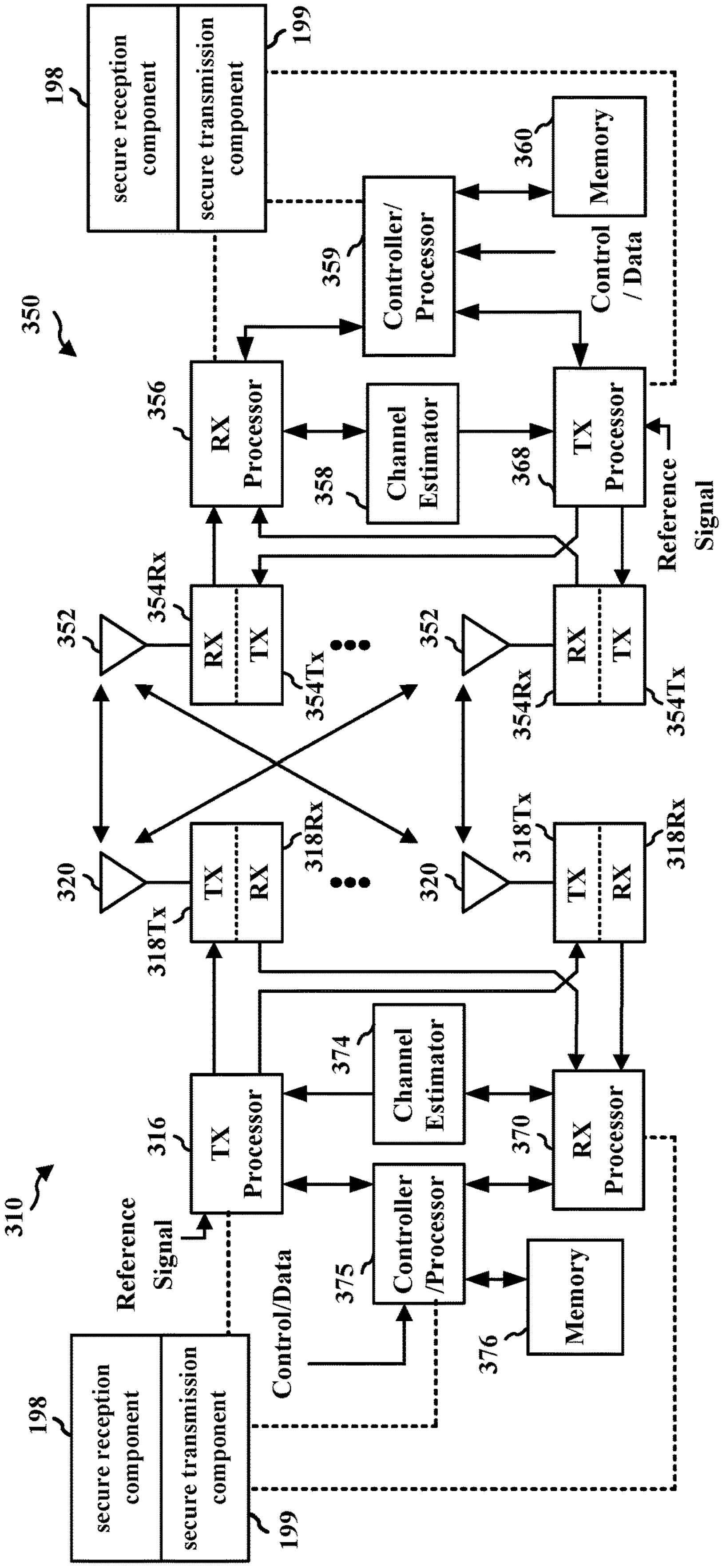
FIG. 3 is a diagram illustrating an example of a base station and user equipment (UE) in an access network.

FIG. 3 is a block diagram of a UE 310 in communication with a UE 350 based on a D2D communication link, such as an ultra-wide band (UWB) connection, a sidelink channel, or a DL/UL WWAN spectrum. In some examples, the UE 310 and the UE 350 may communicate based on UWB or other D2D communication. The communication may be based on sidelink using a PC5 interface. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the UE 310. These soft decisions may be based on channel estimates computed by the channel estimator 358. The soft decisions are then decoded and deinterleaved to recover the data and control signals that were originally transmitted by the UE 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. The controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the UE 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the UE 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The transmission is processed at the UE 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. The controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the secure reception component 198 of FIG. 1.

At least one of the TX processor 368, the RX processor 356, and the controller/processor 359 may be configured to perform aspects in connection with the secure transmission component 199 of FIG. 1.

At least one of the TX processor 316, the RX processor 370, and the controller/processor 375 may be configured to perform aspects in connection with the secure reception component 198 of FIG. 1.

At least one of the TX processor 316, the RX processor 370, and the controller/processor 375 may be configured to perform aspects in connection with the secure transmission component 199 of FIG. 1.

Figure 4:
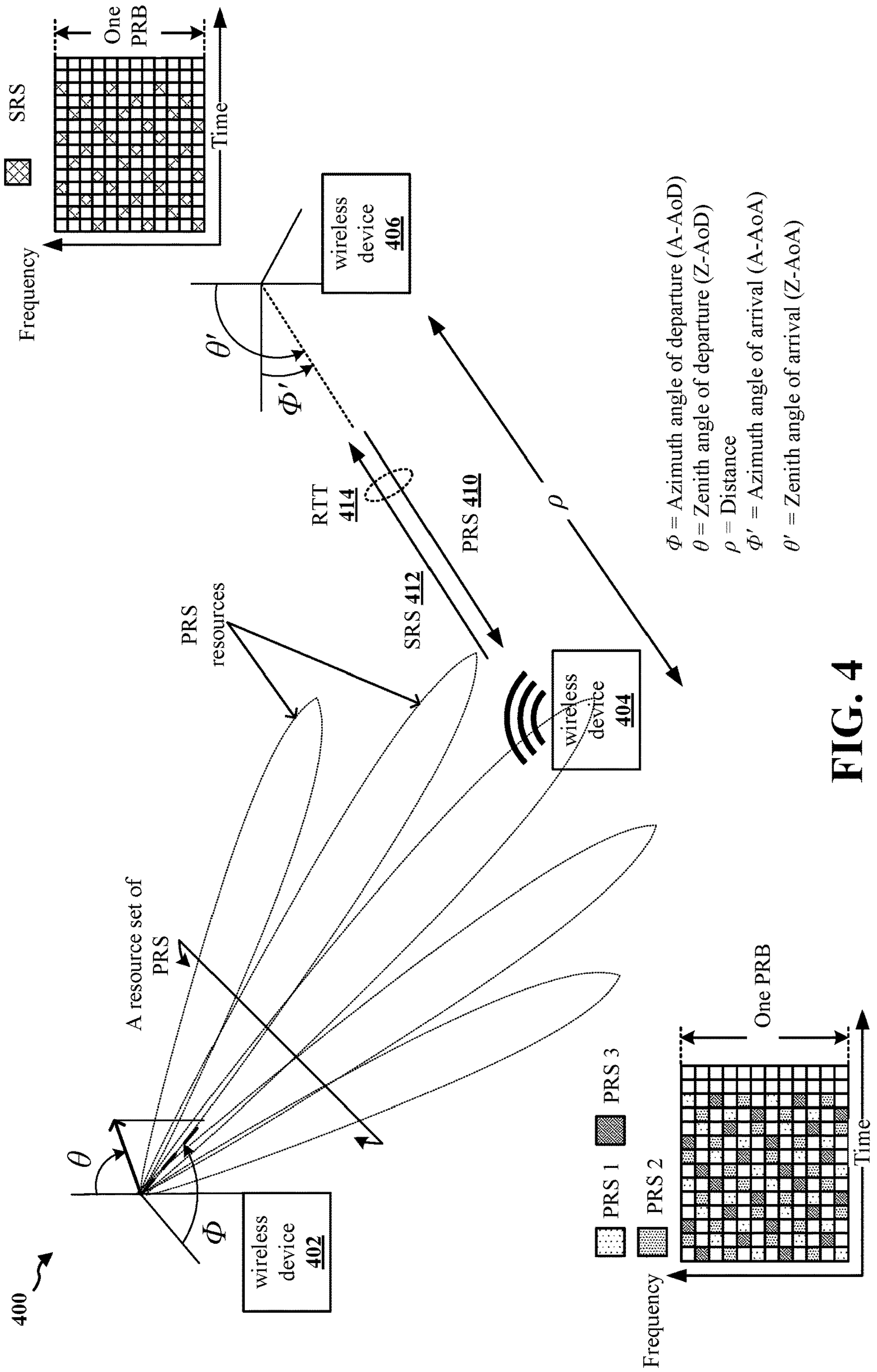
FIG. 4 is a diagram illustrating an example of positioning based on positioning signal measurements.

FIG. 4 is a diagram 400 illustrating an example of a positioning session based on positioning signal measurements. A positioning signal may be any reference signal which may be measured to calculate a position attribute or a location attribute of a wireless device, for example a positioning reference signal (PRS), a sounding reference signal (SRS), a channel state information (CSI) reference signal (CSI-RS), or a synchronization and signal block (SSB). The wireless device 402 may be a base station, such as a TRP, or a UE with a known position/location, such as a positioning reference unit (PRU) or a UE with a high-accuracy sensor that may identify the location of the UE, for example a GNSS sensor or a GPS sensor. The wireless device 406 may be a base station or a UE with a known position/location. The wireless device 404 may be a UE or a TRP configured to perform positioning to gather data, for example to gather data to train an artificial intelligence machine learning (AI/ML or AIML) model, test positioning signal strength or test positioning noise attributes in an area. The wireless device 404 may transmit UL-SRS 412 at time $T_{SRS\_TX}$ and receive DL positioning reference signals (PRS) (DL-PRS) 410 at time $T_{PRS\_RX}$. The wireless device 406 may receive the UL-SRS 412 at time $T_{SRS\_RX}$ and transmit the DL-PRS 410 at time $T_{PRS\_TX}$. The wireless device 404 may receive the DL-PRS 410 before transmitting the UL-SRS 412, or may transmit the UL-SRS 412 before receiving the DL-PRS 410. In both cases, a positioning server (e.g., location server(s) 168, LMF 166) or the wireless device 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple wireless devices 402, 406 and measured by the wireless device 404, and the measured TRP Rx-Tx time difference measurements (i.e., $|T_{SRS\_RX}-T_{PRS\_TX}|$) and UL-SRS-RSRP at multiple wireless devices 402, 406 of uplink signals transmitted from wireless device 404. The wireless device 404 may measure the UE Rx-Tx time difference measurements (and optionally DL-PRS-RSRP of the received signals) using assistance data received from the positioning server, and the wireless devices 402, 406 may measure the gNB Rx-Tx time difference measurements (and optionally UL-SRS-RSRP of the received signals) using assistance data received from the positioning server. The measurements may be used at the positioning server or the wireless device 404 to determine the RTT. The RTT may be used to estimate the location of the wireless device 404. Other methods are possible for determining the RTT, such as for example using DL-TDOA and/or UL-TDOA measurements.

DL-AoD positioning may make use of the measured DL-PRS-RSRP of downlink signals received from multiple wireless devices 402, 406 at the wireless device 404. The wireless device 404 may measure the DL-PRS-RSRP of the received signals using assistance data received from the positioning server, and the resulting measurements may be used along with the azimuth angle of departure (A-AoD), the zenith angle of departure (Z-AoD), and/or other configuration information to locate the wireless device 404 in relation to the neighboring wireless devices 402, 406.

DL-TDOA positioning may make use of the DL reference signal time difference (RSTD) (and optionally DL-PRS-RSRP) of downlink signals received from multiple wireless devices 402, 406 at the wireless device 404. The wireless device 404 may measure the DL RSTD (and optionally DL-PRS-RSRP) of the received signals using assistance data received from the positioning server, and the resulting measurements may be used along with other configuration information to locate a position/location the wireless device 404 in relation to the neighboring wireless devices 402, 406.

UL-TDOA positioning may make use of the UL relative time of arrival (RTOA) (and optionally UL-SRS-RSRP) at multiple wireless devices 402, 406 of uplink signals transmitted from wireless device 404. The wireless devices 402, 406 may measure the UL-RTOA (and optionally UL-SRS-RSRP) of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices 402, 406 of uplink signals transmitted from the wireless device 404. The wireless devices 402, 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5B:
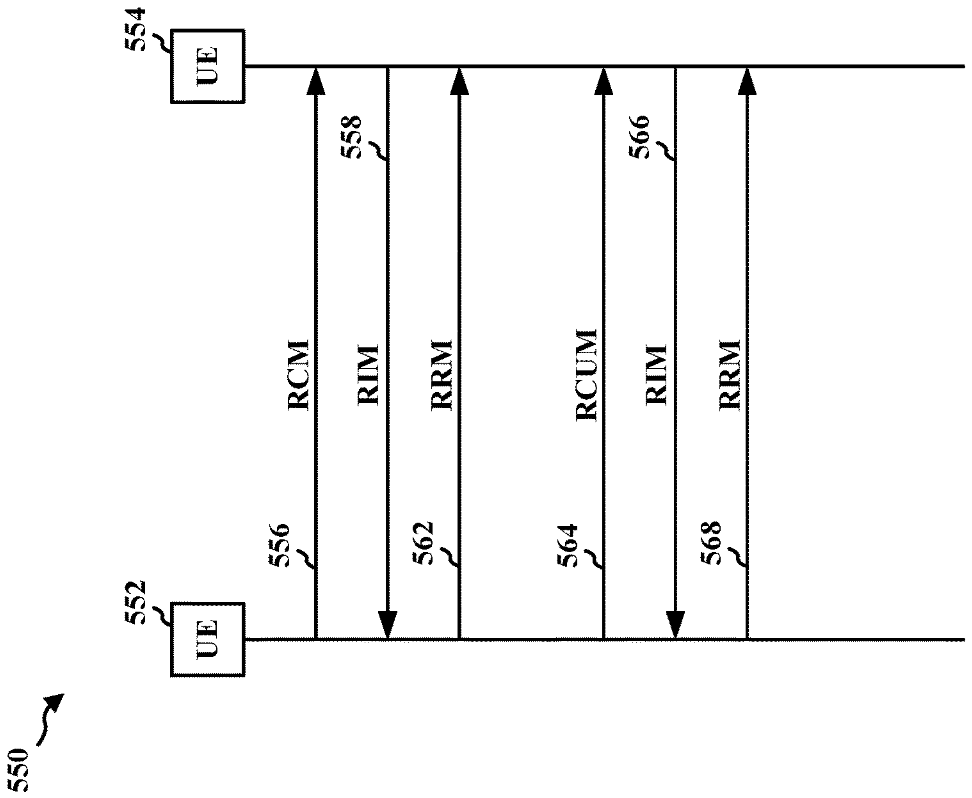
FIG. 5B is a connection flow diagram illustrating an example of ranging signals exchanged between positioning wireless devices.
Figure 5A:
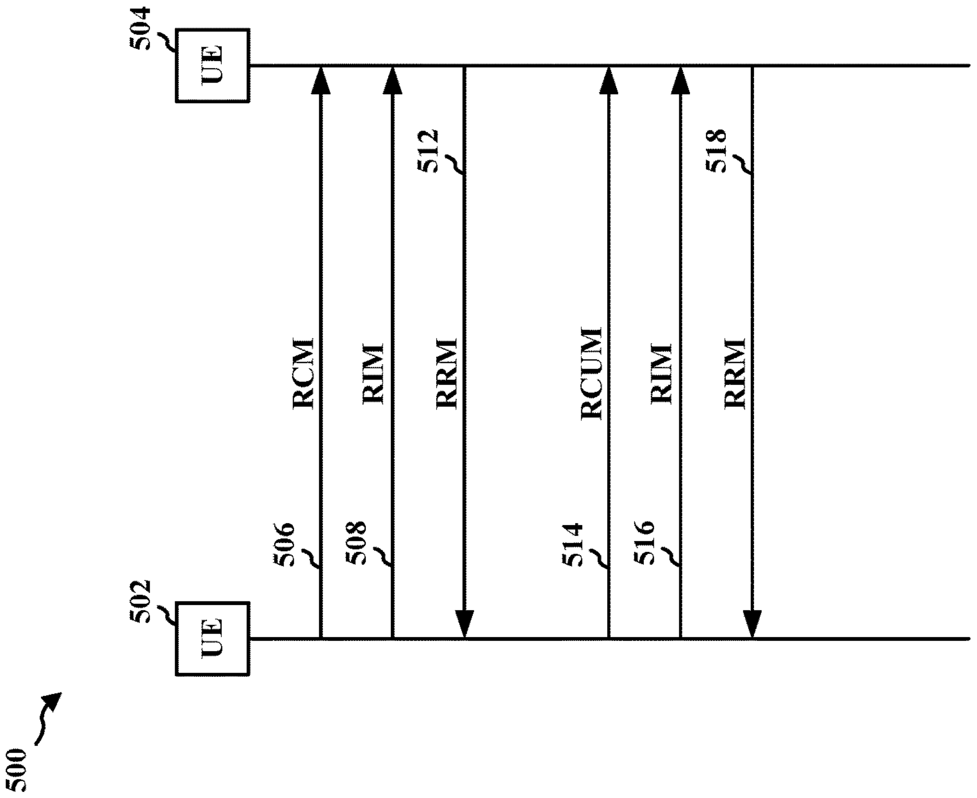
FIG. 5A is a connection flow diagram illustrating an example of ranging signals exchanged between positioning wireless devices.

In some aspects, two wireless devices may be configured to perform ranging operations with one another, for example by exchanging positioning signals with one another and estimating the distance between the devices based on a measured time of arrival (ToA), round-trip time (RTT), reference signal strength indicator (RSSI) or reference signal received power (RSRP). FIGS. 5A and 5B illustrate examples of UEs configured to perform ranging operations with one another.

FIG. 5A is a diagram 500 illustrating an example of a UE 502 configured to perform ranging with a UE 504. The UE 502 may include an enhanced ranging device (ERDEV). The UE 504 may include an ERDEV. The UE 502 may be a controller for the ranging session. In other words, the UE 502 may control the ranging session and may define the ranging parameters for the ranging session between the UE 502 and the UE 504. The UE 504 may be a controlee for the ranging session. In other words, the UE 504 may use the ranging parameters received from the UE 502 to perform ranging with the UE 502.

The UE 502 may transmit a ranging control message (RCM) 506 to the UE 504. The UE 504 may receive the RCM 506 from the UE 502. The RCM may include a set of ranging parameters configured by the UE 502. The ranging parameters may include, for example, timing, bandwidth, periodicity, and/or measurement configuration for a ranging session. The RCM 506 may designate the UE 502 as the initiator for the ranging session and the UE 504 as the responder for the ranging session. In other words, the UE 502 may initiate a ranging exchange between the UE 502 and the UE 504 by transmitting a first message of the exchange to the UE 504, and the UE 504 may respond to the first message of the exchange with a response message. For example, the UE 502 may transmit a ranging initiation message (RIM) 508 to the UE 504 based on the parameters of the RCM 506. The RIM 508 may be the first message of a ranging exchange between the UE 502 and the UE 504. The UE 504 may receive the RIM 508 based on the parameters of the RCM 506. In response to receiving the RIM 508, the UE 504 may transmit a ranging response message (RRM) 512 to the UE 502 based on the configuration parameters of the RCM 506. The UE 502 may receive the RRM 512 based on the parameters of the RCM 506. The UE 502 may perform ranging based on the RRM 512. Any suitable positioning may be performed by the UE 502 based on the RRM 512. In one aspect, the UE 502 may measure an RTT of the ranging session based on the RRM 512. In another aspect, the RRM 512 may include an indicator of a set of measurements taken by the UE 504 (e.g., ToA, RSRP), and the UE 502 may calculate a range between the UE 502 and the UE 504 based on the measurements.

In some aspects, the UE 502 may change a subset of the parameters for the ranging session with an update message. For example, the UE 502 may transmit a ranging control update message (RCUM) 514 to the UE 504. The UE 504 may receive the RCUM 514 from the UE 502. The RCUM 514 may include an update of a subset of the parameters, for example a timing update or an encoding update. The UE 502 may then transmit an RIM 516 to the UE 504 based on parameters of the RCUM 514. The UE 504 may receive the RIM 516 from the UE 502 based on the parameters of the RCUM 514. The UE 504 may transmit an RRM 518 to the UE 502 based on the parameters of the RCUM 514. The UE 502 may receive the RRM 518 from the UE 504 based on the parameters of the RCUM 514. The UE 502 may then perform ranging based on the RRM 518 received from the UE 504.

FIG. 5B is a diagram 550 illustrating an example of a UE 552 configured to perform ranging with a UE 554. The UE 552 may include an ERDEV. The UE 554 may include an ERDEV. The UE 552 may be a controller for the ranging session. The UE 554 may be a controlee for the ranging session.

The UE 552 may transmit an RCM 556 to the UE 554. The UE 554 may receive the RCM 556 from the UE 552. The RCM may include a set of ranging parameters configured by the UE 552. The RCM 556 may designate the UE 554 as the initiator for the ranging session and the UE 552 as the responder for the ranging session. In other words, the UE 554 may initiate a ranging exchange between the UE 552 and the UE 554 by transmitting a first message of the exchange to the UE 552, and the UE 552 may respond to the first message of the exchange with a response message. For example, the UE 554 may transmit an RIM 558 to the UE 552 based on the parameters of the RCM 556. The RIM 558 may be the first message of a ranging exchange between the UE 552 and the UE 554. The UE 552 may receive the RIM 558 based on the parameters of the RCM 556. In response to receiving the RIM 558, the UE 552 may transmit an RRM 562 to the UE 554 based on the configuration parameters of the RCM 556. The UE 554 may receive the RRM 562 based on the parameters of the RCM 556. The UE 554 may perform ranging based on the RRM 562.

In some aspects, the UE 552 may change a subset of the parameters for the ranging session with an update message. For example, the UE 552 may transmit an RCUM 564 to the UE 554. The UE 554 may receive the RCUM 564 from the UE 552. The RCUM 564 may include an update of a subset of the parameters, for example a timing update or an encoding update. The UE 554 may then transmit an RIM 566 to the UE 552 based on parameters of the RCUM 564. The UE 552 may receive the RIM 566 from the UE 554 based on the parameters of the RCUM 564. The UE 552 may transmit an RRM 568 to the UE 554 based on the parameters of the RCUM 564. The UE 554 may receive the RRM 568 from the UE 552 based on the parameters of the RCUM 564. The UE 554 may then perform ranging based on the RRM 568 received from the UE 552.

As shown, either an initiator or a responder device for a ranging session may be a controller, which may transmit RCM or RCUM messages to the other ranging device for designating parameters for a ranging session conducted between the initiator and the responder device. The ranging session may include a RIM from the initiator to the responder and an RRM from the responder to the initiator.

Figure 6A:
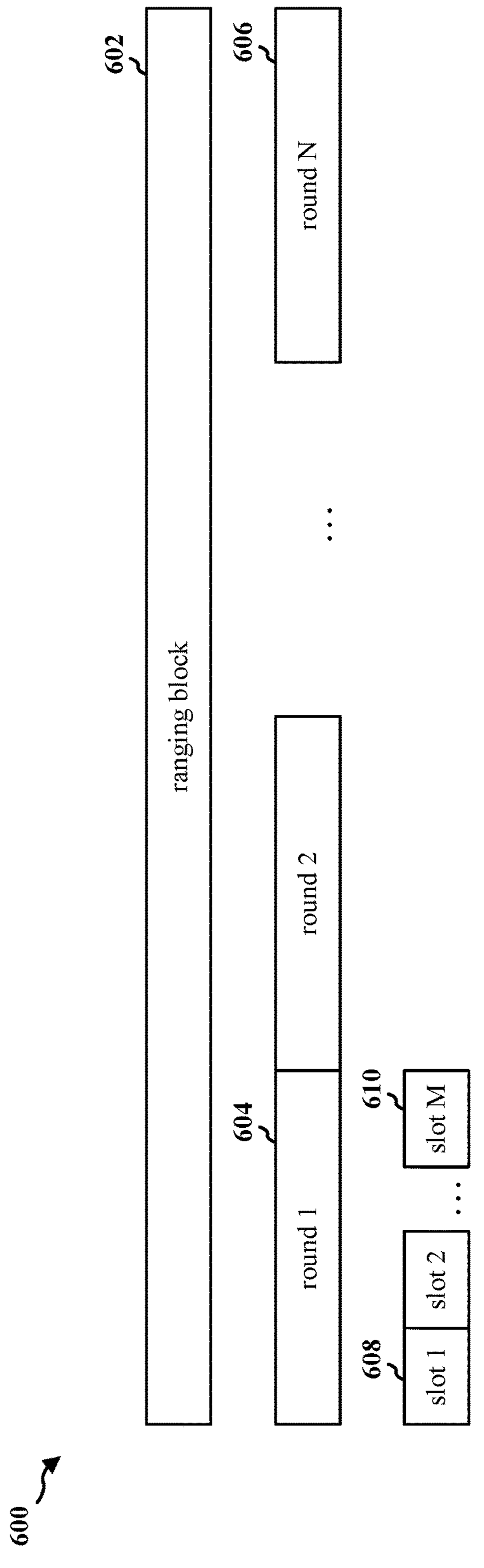
FIG. 6A is a diagram illustrating an example of a ranging session between wireless devices.

FIG. 6A is a diagram 600 illustrating signals that may be exchanged between wireless devices for a ranging session between wireless devices. A ranging session (e.g., time-scheduled ranging, contention free ranging) may be conducted using ultra-wide band (UWB) signals. A ranging session may include ranging messages that include a set of consecutive ranging blocks, such as the ranging block 602. Each ranging block may have a plurality of ranging rounds. The plurality of ranging rounds may have a series of consecutive ranging rounds, for example from a first ranging round 604 to an Nth ranging round 606. Each ranging round in a ranging block may be referenced by a ranging round index relative to the first ranging round 604 in the ranging block. Each ranging round may have a plurality of ranging slots. The plurality of ranging slots may have a series of consecutive ranging slots from a first ranging slot 608 to an Mth ranging slot 610. Each ranging slot in a ranging round may be referenced by a ranging slot index relative to the first ranging slot 608 in the ranging block. A ranging round may have a sufficient duration to complete a range-measurement cycle. A ranging round usage pattern may be repeated in subsequent ranging blocks to periodically update ranging measurements.

Figure 6B:
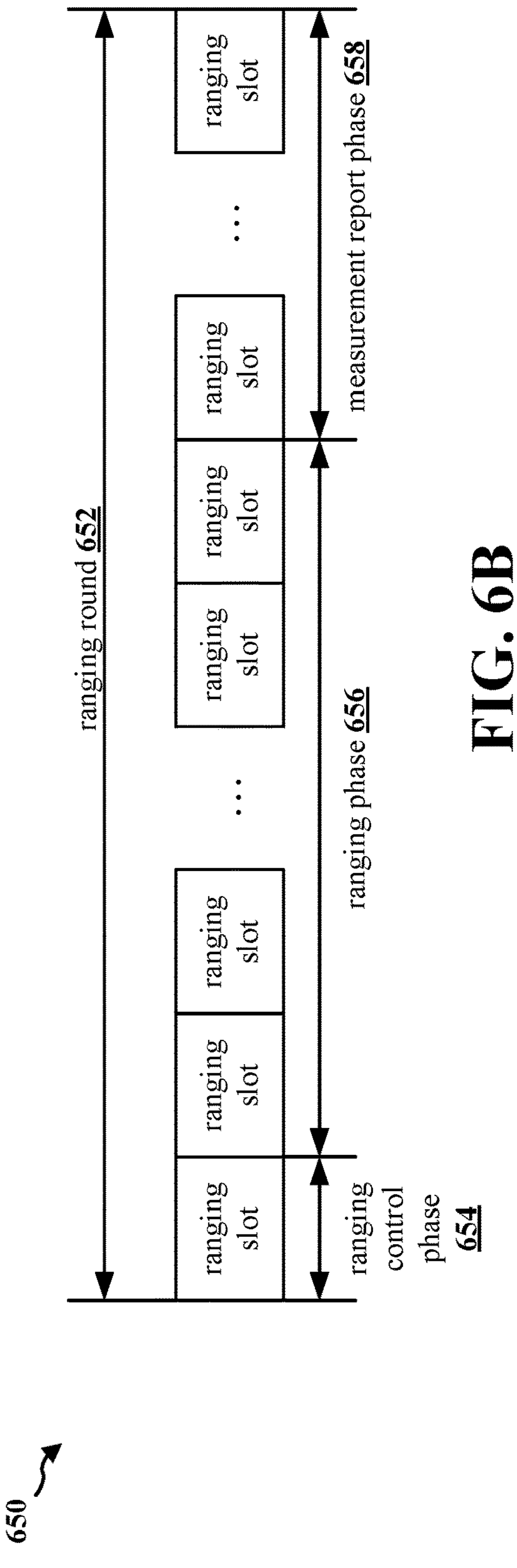
FIG. 6B is a diagram illustrating an example of a ranging round in FIG. 6A.

FIG. 6B is a diagram 650 illustrating an example of a ranging round of FIG. 6A, for example the first ranging round 604 or the Nth ranging round 606. The ranging round 652 in FIG. 6B may include a ranging control phase 654, a ranging phase 656, and a measurement report phase 658. Within a ranging block, a responder wireless device may transmit a message within a single round. The round index may be statically configured by a controller wireless device, or may be selected as per a hopping pattern. The slots within a chosen round may be used sequentially to perform ranging, for example based on a RTT or based on a time difference of arrival (TDoA). A ranging control phase 654 of a round may include one or two slots, for example one slot to initiate the ranging round by an initiator wireless device or two slots to initiate the ranging round by an initiator wireless device and respond to the initiation message. A ranging phase 656 may include a plurality of slots when UWB fragments are transmitted by a transmitting wireless device and measured by a receiving wireless device. A measurement report phase 658 may include a plurality of slots when measurements may be reported by the measuring device. In some aspects, a ranging round may not include a measurement report phase, when the wireless device receiving the ranging signals calculates the range itself.

Figure 7:
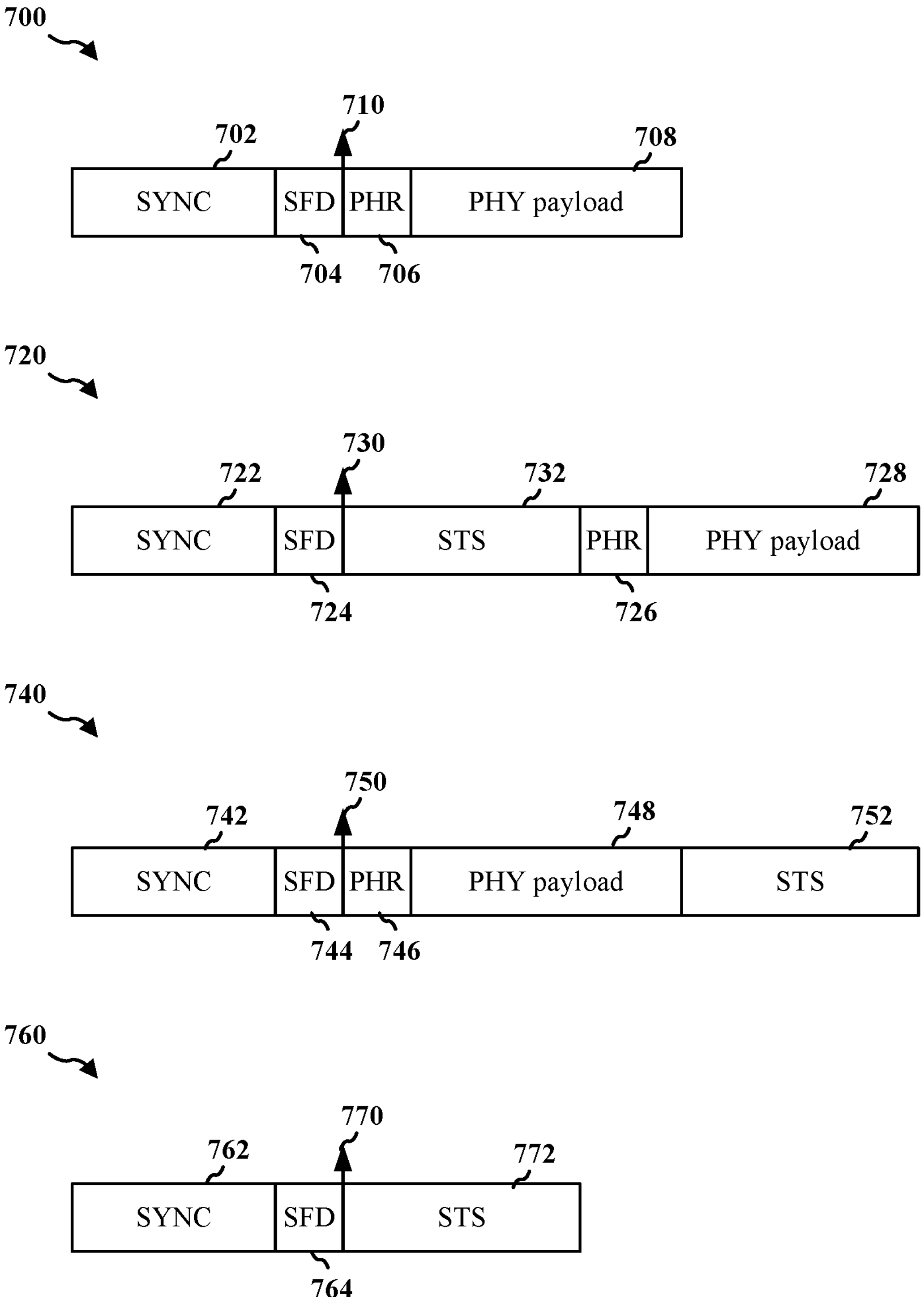
FIG. 7 includes diagrams illustrating examples of packet configurations for ranging.

FIG. 7 includes diagrams 700, 720, 740, and 760 illustrating examples of packet configurations for ranging. The diagrams may represent physical layer protocol data unit (PPDU) fields of a PPDU format. Diagram 700 illustrates a packet configuration including a synchronization (SYNC) preamble 702, a start of frame delimiter (SFD) 704, a physical layer header (PHR) 706 and a physical (PHY) payload 708. The SYNC preamble 702 may include a class of sequences, for example an Ipatov ternary sequence, that have good correlation properties as opposed to other sequences to improve channel estimation at the receiver, thereby improving the accuracy of measurements, such as ToA estimates. In other words, the SYNC preamble 702 may assist a receiver in frame detection (i.e., channel estimation) and synchronization (e.g., timing, phase, frequency). The SFD 704 may help to demarcate the SYNC preamble 702 from the PHR 706 and the PHY payload 708. The packet configuration shown in diagram 700 may include a reference marker (RMARKER) reference position 710 which may be used to reference the payload of the packet.

Since the SYNC preamble 702 may be broadcasted by a transmitting wireless device, the SYNC preamble 702 may be susceptible to over-the-air (OTA) spoofer attacks, such as replay attacks. For example, a spoofer may replay the SYNC preamble 702 with an amplified signal, mimicking the strength of the original transmitting wireless device located closer to the receiving wireless device. A secure packet configuration may include a secure sequence (STS) to improve the security of the packet. An STS may include a secure sequence generated using a deterministic random bit generator (DRBG) based on an advanced encryption standard (AES) 128-bit (AES-128) in a counter mode.

Diagram 720 illustrates an STS packet configuration including a SYNC preamble 722, an SFD 724, an STS 732, a PHR 726 and a PHY payload 728. The STS packet configuration shown in diagram 720 may include an RMARKER reference position 730 which may be used to reference the start of the STS 732, the PHR 726, and the PHY payload 728 from the SFD 724. The STS packet configuration in diagram 720 may be used to securely transmit a data payload using an UWB signal.

Diagram 740 illustrates an STS packet configuration including a SYNC preamble 742, an SFD 744, a PHR 746, a PHY payload 748, and an STS 752. The STS packet configuration shown in diagram 740 may include an RMARKER reference position 750 which may be used to reference the start of the PHR 746, the PHY payload 748, and the STS 752 from the SFD 744. The STS packet configuration in diagram 740 may also be used to securely transmit a data payload using an UWB signal, with the secure STS appended to the end of the PHY payload 748.

Diagram 760 illustrates an STS packet configuration including a SYNC preamble 762, an SFD 764, and an STS 772. The STS packet configuration shown in diagram 760 may include an RMARKER reference position 770 which may be used to reference the start of the STS 772 from the SFD 764. The SFD 764 may help to demarcate the SYNC preamble 762 from the STS 772. The STS packet configuration shown in diagram 760 may be used for positioning or ranging, as the size of the STS packet is optimized without a data communication payload.

A SYNC preamble followed by an SFD, for example the SYNC preamble 702 followed by the SFD 704 or the SYNC preamble 722 followed by the SFD 724, may be referred to as a synchronization header (SHR) preamble. Each field may be represented by a ternary sequence of {−1, 0, +1}, where −1 represents a negative pulse, +1 represents a positive pulse, and 0 represents a neutral pulse. In some aspects, a binary sequence of {0, 1} bits may be mapped to a ternary sequence of {−1, 0, +1} by allowing 0 to be mapped to −1. In other words, a binary sequence of {0, 1} bits may be mapped to a ternary sequence of {−1, +1} bits when transmitted using a sequence of binary phase-shift keying (BPSK) symbols. The end of such a payload may be zero-padded to form a ternary bust position modulation (BPM) sequence of {−1, 0, +1}.

An SHR preamble may be constructed using a set of preamble codes and a set of SFD codes. The preamble codes may be predefined by a table that correlates a set of code indices with a set of code sequences (see Table 2). Each code index may also be associated with a channel number.

TABLE 2

SHR preamble codes (31 length)

| code index | channel number | code sequence |
|---|---|---|
| 1 | 0, 1, 8, 12 | −0000+0−0+++0+−000+−+++00−+0−00 |
| 2 | | 0+0+−0+0+000−++0−+ −−− 00+00++000 |
| 3 | 2, 5, 9, 13 | −+0++000−+−++00++0+00−0000−0+0− |
| 4 | | 0000+−00−00−++++0+−+000+0−0++0− |
| 5 | 3, 6, 10, 14 | −0+−00+++−+000−+0+++0−0+0000−00 |
| 6 | | ++00+00 −−− +−0++−000+0+0−+0+0000 |
| 7 | 4, 7, 11, 15 | +0000+−0+0+00+000+0++ −−− 0−+00−+ |
| 8 | | 0+00−0−0++0000 −− +00−+0++−++0+00 |

As shown in Table 2, each channel may be associated with two unique preamble codes having a length of 31 ternary sequences of {−1, 0, +1}. The combination of a channel number and a preamble code sequence may also be referred to as a complex channel. In some aspects, longer preamble code sequences, for example preamble codes having a length of 127 ternary sequences, may be defined (see Table 3).

TABLE 3

SHR preamble codes (127 length)

| code index | channel number | codesequence |
|---|---|---|
| 9 | NB | +00+000−0−−00−−+0+0+00−+−++0+0000++−000+00−00−−0−+0+0−−0−+++0++0 |
| | channels | 00+−0+000++−0+++00−+00+0+0−0++−+−−+000000+00000−+0000−0−000−−+ |
| 10 | 0:3, 5:6, | ++00+0−+00+00+000000−000−00−−000−0+−+0−0+−0−+00000+−00++0−0+00− |
| | 8:10, | −+00+++0+−0+0000−0−0−0−++−+0+00+0+000−+0+++000−−−−+++0000+++0− |
| 11 | 12:14 | −+−0000+00−−00000−0+0+0+−0+00+00+0−00−+++00+000−+0+0−0000+++++ |
| | | −+0+−−0+0++−−0−000+0−+00+0+−−−−000−000000−+00+−0++000++−00++−0−0 |
| 12 | | −+0++000000−0+0−+0−−−+−++00−+0++0+0+0+000−00−00−+00+−++000−+−0−+ |
| | | +00++++0−00−0++00+0+00++−00+000+−000−0−−+0000−0000−−0+00000+− |
| 17 | WB | +−−000−0−0000+−00000+000000+−−+−++0−0+0+00+−00+++0−++0−00+0−+00 |
| | channels | 0++0+++0−−0+0+−0−−00−00+000−++0000+0++−+−00+0+0+−−00−−0−000+00+ |
| 18 | 4, 7, | −−0+++0000++++−−−−000+++0+−000+0+00+0+−++−0−0−0−0000+0−+0+−++00+− |
| | 11, 15 | −00+00++00−+00000+−0−+0−0+−+0−000−−00−000−000000+00+00+−0+00++ |
| 19 | | −0−++00−++000++0−+00+−000000−000−−−−+0+00+−0+000−0−−++0−+0−−+0+− |
| | | +++++00000+0+−000+00+++−00−0+00+00+0−+0+0+0−00000−−00+0000−+−0 |
| 20 | | −−+00000+0−−0000−0000+−−0−000−+000+00−++00+0+00++0−00−0++++0−0++ |
| | | −0−+000++−+00+−00−00−000+0+0+0++0+−00++−+−−−0+−0+0−000000++0+ |

In some aspects, a preamble symbol may be constructed based on the following Kronecker operation:

$$S_i = C_i \otimes \delta_L$$

$S_i$ may be the preamble symbol i.

$C_i$ may be the preamble code sequence i.

$$\delta_L = \begin{cases} 1 & n = 0 \\ 0 & n = 1, \ldots, L-1 \end{cases}$$

L may be a padding length factor.

For example, a preamble code sequence of [−1, +1, 0] may be used to construct a preamble symbol having L=4 by adding L−1=3 zeros after each ternary preamble code symbol, as [−1, 0, 0, 0, +1, 0, 0, 0, 0, 0, 0]. In some aspects, the SYNC preamble $S_i$ of an SHR preamble may include a sequence length of 16, 64, 1024, or 4096.

Figure 8:
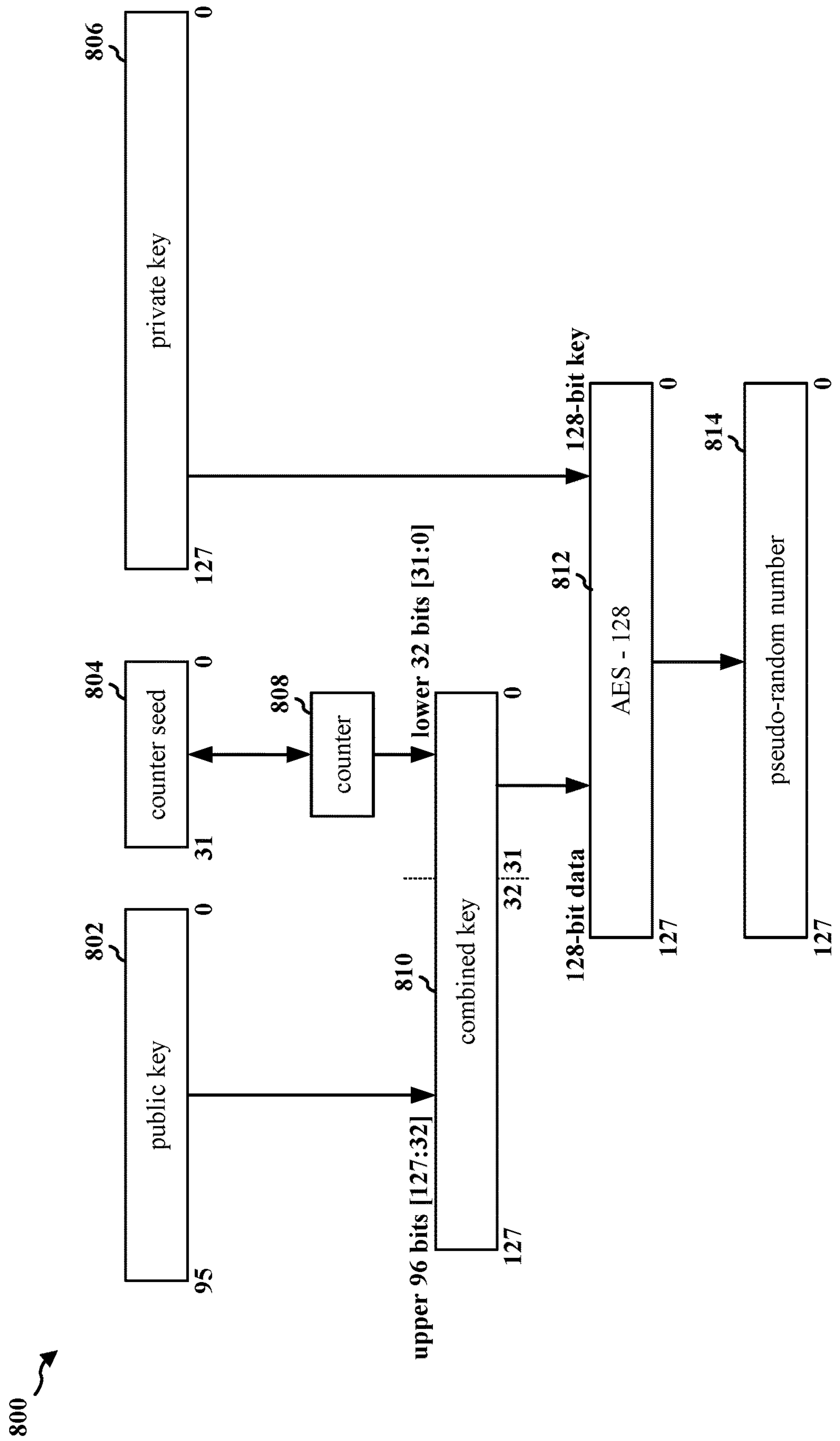
FIG. 8 includes a diagram illustrating exemplary components used for a method of generating a secure pseudo-random number.

FIG. 8 is a diagram 800 illustrating exemplary components used for generating 128-bit pulses for a secure STS. The STS may be generated using an AES-128 DRBG. The STS may use a symmetric-key algorithm that uses the private key 806 for both encrypting and decrypting the STS. A counter seed 804 may be run through a counter 808, and combined with a public key 802 to generate a combined key 810. The private key 806 and the combined key 810 may be fed to an AES-128 812 to encrypt the private key 806 to generate a pseudo-random number 814 of the cyphertext. The pseudo-random number 814 may be stacked on one another to form the pulses of the STS. A set bit may be represented as a positive pulse and a reset bit may be represented as a negative pulse.

Figure 9A:
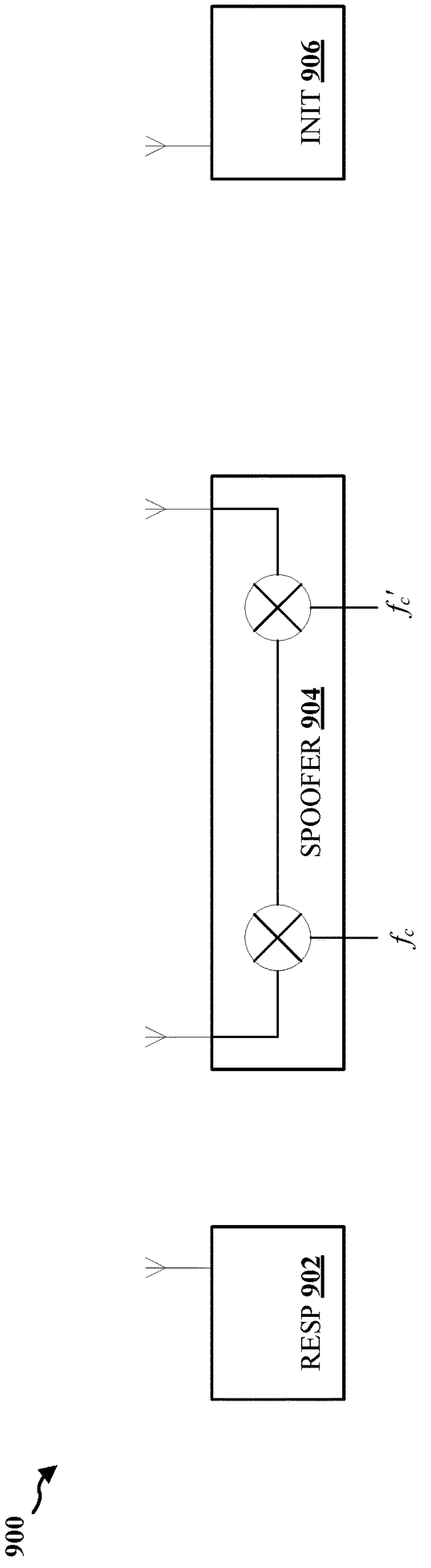
FIG. 9A is a diagram illustrating an example of a spoofer imitating a first wireless device transmitting a ranging signal to a second wireless device.

FIG. 9A is a diagram 900 illustrating an example of a spoofer 904 that may imitate a responder 902 transmitting a ranging signal to an initiator 906. The responder 902 and the initiator 906 may perform single-sided two-way ranging (SS-TWR) as a positioning method. In other words, the initiator 906 and the responder 902 may have a bi-directional exchange of ranging frames to calculate the RTT between the initiator 906 and the responder 902. The initiator 906 may transmit a first ranging frame to the responder 902. The responder 902 may receive the first ranging frame from the initiator 906. In response to receiving the first ranging frame from the initiator 906, the responder 902 may transmit a second ranging frame to the initiator 906. When the initiator 906 receives the second ranging frame from the responder 902, the initiator 906 may compensate for a clock frequency offset and/or a carrier frequency offset (CFO) between the initiator 906 and the responder 902 to improve ranging accuracy. In other words, the clock of the responder 902 may operate a differently than the clock at the initiator 906. Moreover, while both the transmitted ranging frames from the responder 902 and the initiator 906 may be transmitted using the same carrier frequency $f_c$, the responder 902 may be calibrated slightly differently than the initiator 906, resulting in a CFO drift. The responder 902 and the initiator 906 may transmit the ranging frames with a center frequency of $f_c$. The initiator 906 may calculate the error offset c in parts per million (ppm). The initiator 906 may calculate the clock frequency offset c based on the formula $$\hat{T}_{ToA} = \frac{1}{2}(T_{round} - (1-c)T_{reply}),$$

where $T_{round}$ is the RTT of the round and $T_{reply}$ is the reply time of the responder 902 to respond to the initiator 906. The value (1−c) may also be referred to as an inaccuracy factor used to calculate the reply time of the responder 902 to respond to the initiator 906.

In some aspects, the spoofer 904 may attempt to spoof the ranging frame transmitted from the responder 902 to the initiator 906. In other words, the spoofer 904 may attempt to overlap the transmission from the responder 902 with its own transmission to fool the initiator 906 into thinking its transmission is from the responder 902. This may be referred to as a mix-down (MD) manipulation against SS-TWR. The spoofer 904 may receive the transmission from the responder 902, and transmit its own spoofed transmission at a carrier frequency $$f_c'.$$

The carrier frequency $$f_c'$$

from the spoofer 904 may be less than the carrier frequency $f_c$ transmitted from the responder 902. In some aspects, the spoofer 904 may down convert the received ranging frame based on the carrier frequency $f_c$, and may up convert the resultant data based on the carrier frequency $$f_c'$$

The initiator 906 may estimate c based on the carrier frequency offset (CFO) of the received signal from the spoofer 904, which would be fallacious if the initiator 906 uses the spoofed signal with the carrier frequency $$f_c'$$

Such a CFO may lead to a distance reduction in the calculation of the range between the initiator 906 and the responder 902. In other words, the initiator 906 may incorrectly calculate that the responder 902 is closer than it actually is when the responder 902 transmits a ranging frame to the initiator 906.

Figure 9B:
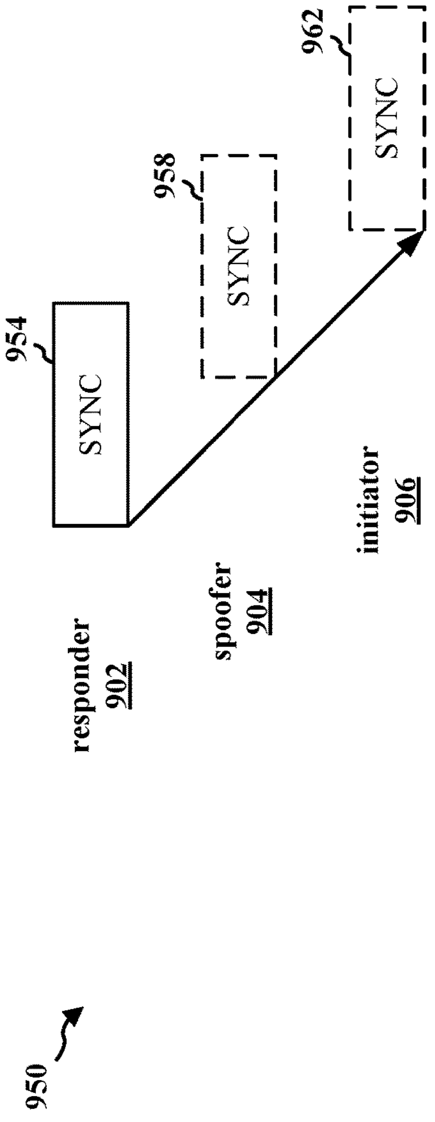
FIG. 9B is a diagram illustrating an example of timing for packets transmitted by the first wireless device and the spoofer, and received by the second wireless device of FIG. 9A.

FIG. 9B is a diagram 950 illustrating an example of timing for packets transmitted by the responder 902 and the spoofer 904, and received by the initiator 906 of FIG. 9A. The responder 902 may transmit a SYNC preamble 954 from a first location. The spoofer 904 may receive the SYNC preamble 954. The spoofer 904 may transmit a SYNC preamble 958 from a second location. In other words, the spoofer 904 may receive the SYNC preamble 954 from the responder 902 at a first carrier frequency ($f_c$), and may replay/transmit the SYNC preamble 958 at a different carrier frequency $$(f_c').$$

In some aspects, the spoofer 904 may replay the SYNC preamble 954 received from the responder 902 with higher power as the SYNC preamble 958. The initiator 906 may receive the SYNC preamble 958 from the spoofer 904 as the SYNC preamble 962, and may use the SYNC preamble 962 transmitted as the SYNC preamble 958 instead of the preamble transmitted as the SYNC preamble 954 to perform ranging with the responder 902. This may result in a distance reduction effect when the initiator 906 calculates the distance between the initiator 906 and the responder 902 based on the SYNC preamble 962.

In some aspects, the change in the calculated $\hat{T}_{TOA}$ from what it would have been if based on the ranging frame transmitted by the responder 902 may vary $$\delta_{ToA} = \frac{\delta_c}{2} T_{reply},$$

where $\delta_c$ is the change in c between the responder 902 and the spoofer 904, and $T_{reply}$ is the reply time of the responder 902. While the spoofer 904 may not be able to alter $T_{reply}$, as the spoofer 904 replays the ranging frame transmitted by the responder 902, the spoofer 904 may be able to alter the $\delta_c$ value by altering the carrier frequency $$f_c'$$

used to replay the ranging frame. In some aspects, the spoofer 904 may reduce the calculated value of c by 25 ppm (e.g., $\delta_c \approx -25$ ppm), which may greatly reduce the calculated distance by the initiator 906.

Figure 10:
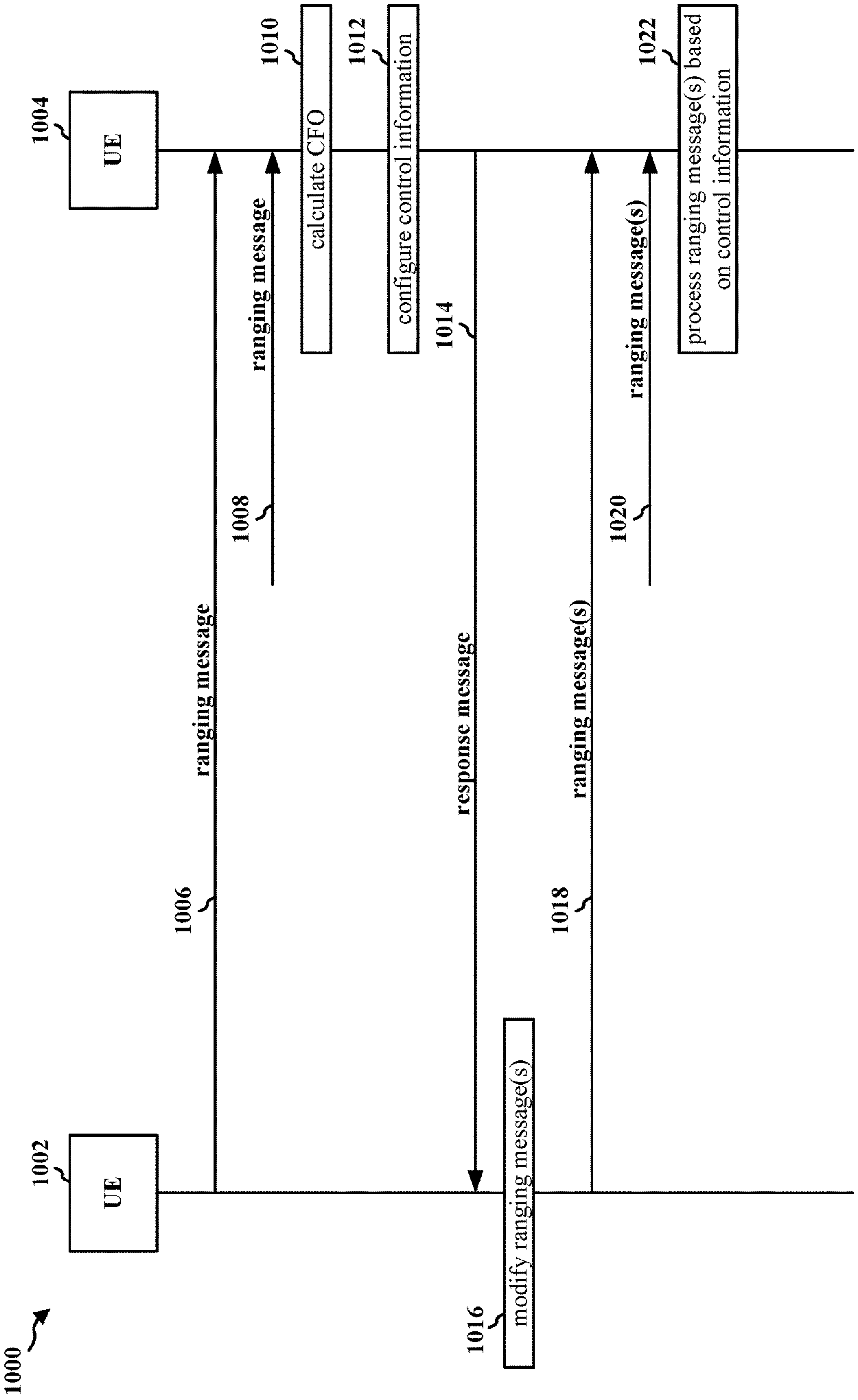
FIG. 10 is a diagram illustrating an example of timing for valid and spoofed ranging signals.

FIG. 10 is a connection flow diagram 1000 illustrating an example of a UE 1002 and a UE 1004 configured to detect and prevent security vulnerabilities for wireless positioning, for example the MD manipulation vulnerability illustrated in FIGS. 9A and 9B. The UE 1002 may transmit a ranging message 1006 to the UE 1004. The UE 1004 may receive the ranging message 1006 from the UE 1002. The ranging message 1006 may be, for example, a RIM or an RRM. In other words, the UE 1002 may be an initiator transmitting an RIM to the UE 1004 as a responder, or the UE 1002 may be a responder transmitting an RRM in response to receiving an RIM from the UE 1004. In some aspects, the UE 1004 may be a controller, which transmits RCM or RCUM to the UE 1002 to configure, or modify, ranging between the UE 1002 and the UE 1004. The UE 1002 may be a controlee that receives configuration messages from the UE 1004. In other aspects the UE 1002 may be the controller, which transmits RCM or RCUM to the UE 1004 to configure, or modify, ranging between the UE 1002 and the UE 1004. The UE 1004 may be a controlee that receives configuration messages from the UE 1002. However, the UE 1004 may be configured, via an RCM or an RCUM from the UE 1002, to transmit an RRM with a payload that indicates that the UE 1002 modify its upcoming transmissions, as described further below.

The UE 1004 may receive at least one other ranging message, such as the ranging message 1008, from other devices, for example a spoofing device similar to the spoofer 904 in FIGS. 9A and 9B. The ranging message 1008 may be a replay of the ranging message 1006 from the UE 1002 with altered attributes, for example an increased transmission power and/or an altered carrier frequency, which may cause the UE 1004 to incorrectly calculate its range relative to the UE 1002 if the UE 1004 bases its ranging on the ranging message 1008 instead of the ranging message 1006. Since the ranging message 1008 may be transmitted with a greater transmission power than the ranging message 1006, the ranging message 1008 may interfere with the UE 1004 receiving the ranging message 1006, negatively influencing the ability for the UE 1004 to measure the ranging message 1006.

At 1010, the UE 1004 may calculate a CFO of a received ranging message. The UE 1004 may compare the calculated CFO against a threshold (e.g., T1). The threshold may be a configured threshold based on a standard or received from a network device, or may be calculated based on previous ranging messages received from the UE 1002. In some aspects, if the calculated CFO is greater than or equal to the threshold value, at 1012, the UE 1004 may configure control information for the UE 1002. In other aspects, if the calculated CFO is greater than or equal to the threshold value (e.g., T1) a number of times that is greater than or equal to a second threshold value (e.g., T2), at 1012, the UE 1004 may configure control information for the UE 1002. In other words, a received ranging message may have an abnormally large CFO due to normal erratic behavior by the UE 1002, but if the erratic behavior persists over time (e.g., over two or over four ranging periods), the UE 1004 may determine that a spoofer is repeatedly transmitting a ranging message with an improperly large CFO. The UE 1004 may process ranging messages that have a calculated CFO that is less than or equal to a threshold value (e.g., CFO≤T1 or CFO<T1) and may ignore/skip/refrain from processing ranging messages that have a calculated CFO that is greater than or equal to the threshold value (e.g., CFO≥T1 or CFO>T1).

The UE 1004 may transmit a response message 1014 to the UE 1002. The response message 1014 may be an RCUM or an RRM. The response message 1014 may include the control information configured at 1012. The response message 1014 may include an indicator for the UE 1002 to modify its upcoming ranging messages in response to the UE 1004 detecting a potential security vulnerability. The response message 1014 may be an RCUM or an RRM with additional control information for the UE 1002 to modify its upcoming transmissions. The response message 1014 may be encoded with an STS and a payload.

The control information may include an indicator for the UE 1002 to transmit the set of ranging messages 1018 based on a set of frequency offsets. The indicator may be, for example, an index to a set of frequency offsets indicated in an RCM/RCUM transmitted by the UE 1002 to the UE 1004 (e.g., where the UE 1002 is the controller), or by the UE 1004 to the UE 1002 (e.g., where the UE 1004 is the controller).

In one aspect, at 1016, the UE 1002 may modify the set of ranging messages 1018 based on the set of frequency offsets. In some aspects, the set of frequency offsets may include a single frequency offset, such that UE 1002 transmits each of the set of ranging messages based on the single frequency offset. In other aspects, the set of frequency offsets may be drawn from a pseudo-random sequence, such that UE 1002 transmits each of the set of ranging messages based on a discrete, but known frequency offset. For example, where the set of ranging messages 1018 include a set of RRMs transmitted in response to receiving a set of RIMs from the UE 1004, the set of RIMs may be received with a center frequency, and each of the set of RRMs may be transmitted with a discrete frequency offset from the center frequency. In another example, where the set of ranging messages 1018 include a set of RIMs, the set of RIMs may each be transmitted offset from a known defined frequency, such that the center frequency for each of the set of RIMS is offset from the known defined frequency based on the discrete frequency offset associated with the RIM. The UE 1004 may receive the set of ranging messages 1018. At 1022, the UE 1004 may process the set of ranging messages 1018 based on the control information, for example by decoding and measuring messages that have a calculated CFO that is less than or equal to the threshold value (calculated based on the indicated set of frequency offsets), and by ignoring messages that have a calculated CFO greater than or equal to the threshold value (calculated based on the indicated set of frequency offsets). As such, if the UE 1004 receives other ranging messages, for example the set of ranging messages 1020, from a spoofing device, the UE 1004 may ignore/skip such messages.

In another aspect, at 1016, the UE 1002 may modify each of the preamble symbols (e.g., each symbol of the SYNC preamble) for each of the set of ranging messages 1018 based on the set of frequency offsets. In other words, the response message 1014 may indicate a plurality of frequency offsets, where each of the plurality of frequency offsets is associated with a preamble symbol for each of the set of ranging messages 1018. The UE 1002 may transmit each of the preamble symbols for each of the set of ranging messages 1018 based on a discrete, but known, frequency offset drawn from a pseudo-random sequence. For example, where the set of ranging messages 1018 include a set of RRMs transmitted in response to receiving a set of RIMs from the UE 1004, the set of RIMs may be received with a center frequency, and each preamble symbol of the set of RRMs may be transmitted with a discrete frequency offset from the center frequency of the correlating RIM. In another example, where the set of ranging messages 1018 include a set of RIMs, each preamble symbol of the set of RIMs may be transmitted offset from a known defined frequency, such that the center frequency for each preamble symbol of the set of RIMS is offset from the known defined frequency based on the set of discrete frequency offsets associated with the RIM. In some aspects, the UE 1002 may insert guard/null periods between preamble symbols for carrier switching. In other words, the UE 1002 may pad the preamble symbols with a set of guard periods for carrier switching. The response message 1014 may indicate to the UE 1002 whether or not to pad the preamble symbols. The UE 1004 may receive the set of ranging messages 1018. At 1022, the UE 1004 may process the set of ranging messages 1018 based on the control information, for example by decoding and measuring preamble symbols that have a calculated CFO that is less than or equal to the threshold value (calculated based on the indicated set of frequency offsets), and by ignoring preamble symbols that have a calculated CFO greater than or equal to the threshold value (calculated based on the indicated set of frequency offsets). As such, if the UE 1004 receives other ranging messages, for example the set of ranging messages 1020, from a spoofing device, the UE 1004 may ignore/skip such messages. Even if a spoofing device may successfully perform MD manipulation against a portion of a preamble, the UE 1004 may calculate the CFO for each portion of the preamble and discard the portions that may have been affected by a spoofer, using the remaining portion for processing (e.g., calculating time synchronization, calculating frequency synchronization, performing channel estimation, calculating ToA).

Figure 11A:
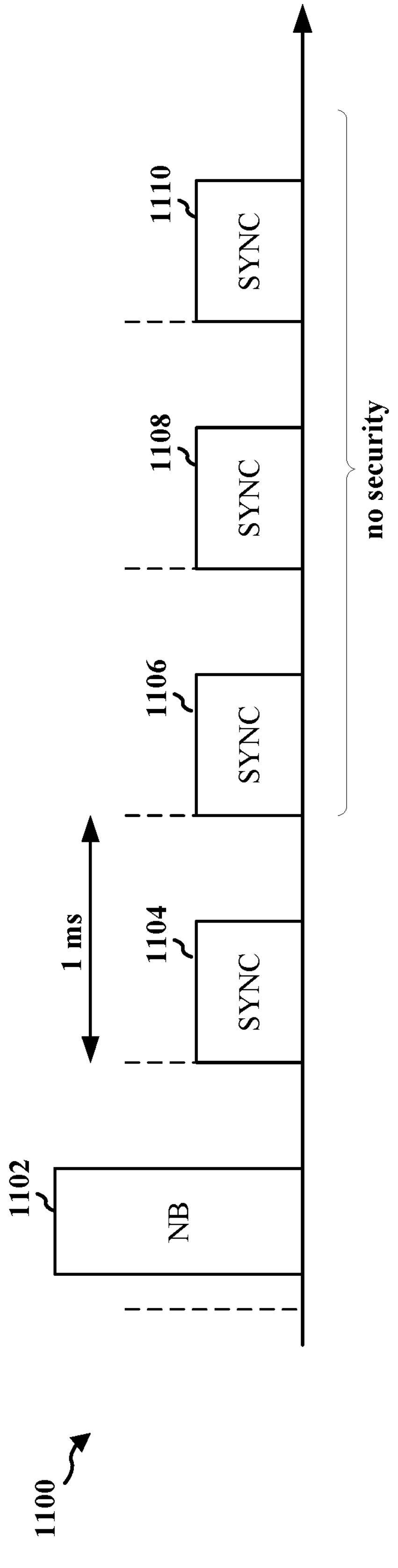
FIG. 11A is a diagram illustrating an example of a set of ranging signals used for positioning between wireless devices.

In some aspects, a pair of ranging devices may perform other types of ranging, for example narrowband-assisted multi-millisecond (NBA-MMS) ranging. FIG. 11A is a diagram 1100 illustrating an example of a set of ranging signals used for NBA-MMS ranging. The set of ranging signals may include UWB signals. The UWB signals may not exceed-14 decibel milliwatts (dBm). The set of ranging signals may include NB signals, for example Bluetooth signals. The NB signals may be transmitted at 0 dBm or 20 dBm. The set of ranging signals may include a combination of a set of NB signals and a set of UWB signals.

For example, a UE may be configured to first transmit a NB signal 1102 followed by a plurality of UWB signals, UWB signal 1104, UWB signal 1106, UWB signal 1108, and UWB signal 1110. The NB signal 1102 may be transmitted using a smaller bandwidth, but a higher range, than the plurality of UWB signals. The NB signal 1102 may be used to perform a coarse estimation of the timing/frequency offsets between the transmitter wireless device and the receiver wireless device, and the plurality of UWB signals may be used to perform a fine estimation of the timing/frequency offsets between the transmitter wireless device and the receiver wireless device. The SYNC packets may use less memory to calculate a more accurate estimate for the timing and/or frequency synchronization. The plurality of UWB signals may be transmitted at a 1 millisecond (ms) periodicity.

The NB signal 1102 may be a Bluetooth signal. The plurality of UWB signals that include the UWB signal 1104, the UWB signal 1106, the UWB signal 1108, and the UWB signal 1110 may include SYNC packets. While using a plurality of SYNC packets for ranging may improve the accuracy of ranging calculations, a ranging round that does not include STS may be easily spoofed as there is less security with such ranging rounds.

Figure 11B:
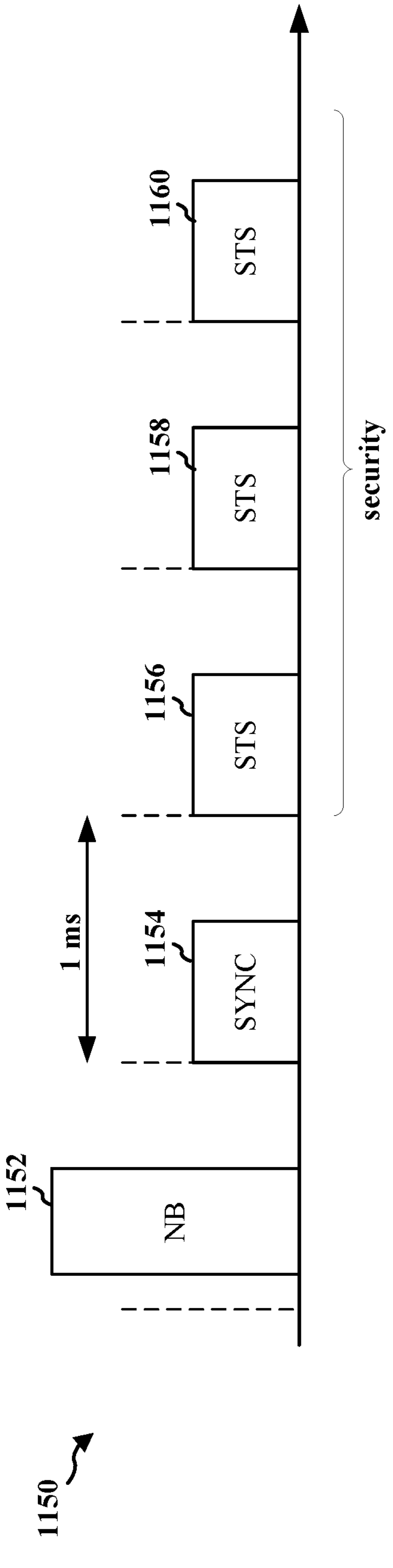
FIG. 11B is a diagram illustrating an example of a set of ranging signals used for positioning between wireless devices.

FIG. 11B is a diagram 1150 illustrating another example of a set of ranging signals that may be used for NBA-MMS ranging. The set of ranging signals may include a combination of a set of NB signals and a set of UWB signals. For example, a UE may be configured to first transmit a NB signal 1152 followed by a plurality of UWB signals, UWB signal 1154, UWB signal 1156, UWB signal 1158, and UWB signal 1160. The NB signal 1152 may be transmitted using a smaller bandwidth, but a higher range, than the plurality of UWB signals. The NB signal 1152 may be used to perform a coarse estimation of the timing/frequency offsets between the transmitter wireless device and the receiver wireless device, and the plurality of UWB signals may be used to perform a fine estimation of the timing/frequency offsets between the transmitter wireless device and the receiver wireless device. The plurality of UWB signals may be transmitted at a 1 ms periodicity.

The NB signal 1152 may be a Bluetooth signal. The plurality of UWB signals that include the UWB signal 1154, the UWB signal 1156, the UWB signal 1158, and the UWB signal 1160 may include SYNC packets and STS. The receiver wireless device may use the NB signal 1152 to perform a coarse estimation of the timing/frequency offsets, may use the UWB signal 1154 to perform a fine estimation of the timing/frequency offsets, and may use the UWB signal 1156, the UWB signal 1158, and the UWB signal 1160 to perform secure ranging, and may cross-reference the calculated CFO for the STS against the calculated CFO for the SYNC to detect whether a spoofer is attempting to mimic signals from the transmitter wireless device. The SYNC packets may use less memory to calculate a more accurate estimate for the timing and/or frequency synchronization.

With the improved timing/frequency estimation, the STS may be used for security, while still using less memory/complexity than the NB signal 1152 or the UWB signal 1154.

Figure 12:
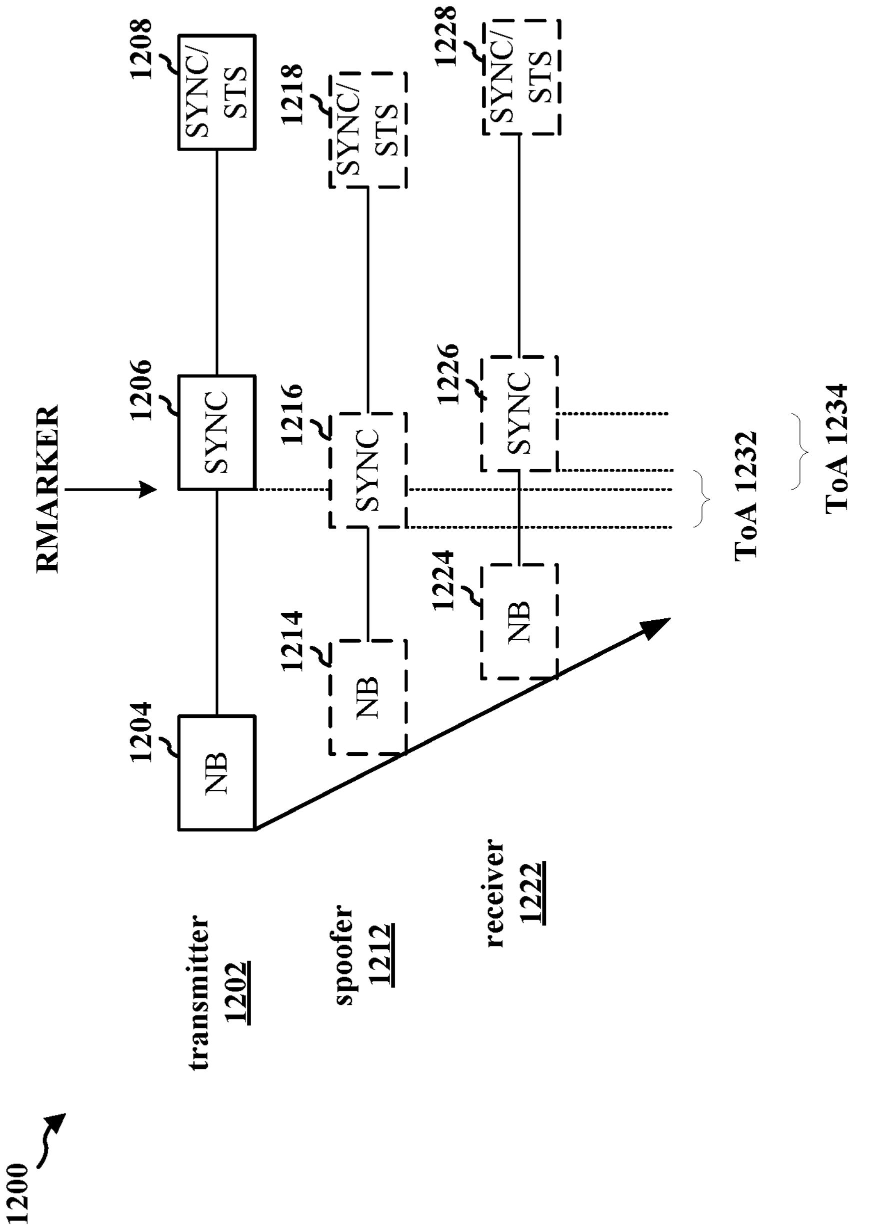
FIG. 12 is a diagram illustrating an example of timing for packets transmitted and received during a spoofing scenario during a ranging session between wireless devices.

FIG. 12 is a diagram 1200 illustrating an example of timing for packets transmitted and received during a spoofing scenario during a ranging session between a transmitter 1202 and a receiver 1222. The transmitter 1202 may transmit a NB packet 1204 for the receiver 1222 to use for a coarse timing/frequency synchronization calculation. The spoofer 1212 may receive the NB packet 1204 from the transmitter 1202, and may replay the NB packet 1204 as the NB packet 1214 using an MD manipulation attack (e.g., with a higher power, an altered carrier frequency). The receiver 1222 may receive the NB packet 1214 as the NB packet 1224 from the spoofer 1212. The receiver 1222 may incorrectly calculate the coarse range between the transmitter 1202 and the receiver 1222 to be smaller than normal due to the attack by the spoofer 1212.

The transmitter 1202 may then transmit a SYNC packet 1206 for the receiver 1222 to use for a fine timing/frequency synchronization calculation. The spoofer 1212 may transmit a SYNC packet 1216 before the transmitter 1202 transmits the SYNC packet 1206 for the receiver 1222. This may be referred to as a stretch-and-advance (SA) manipulation against NBA-MMS. The spoofer 1212 may select a code sequence based on an indicator, for example a code index in the NB packet 1204 of the transmitter or a code index indicated in a previous transmission by one of the transmitter 1202 or the receiver 1222. The spoofer 1212 may transmit the SYNC packet 1216 at a time based on the MD manipulation attack when transmitting the NB packet 1214, simulating a transmission by the transmitter 1202 in a location that is closer to the receiver 1222 than the transmitter 1202 is actually located. The receiver 1222 may receive the SYNC packet 1216 as the SYNC packet 1226 at a time earlier than when the receiver 1222 receives the SYNC packet 1206 from the transmitter 1202. As a result, the receiver 1222 may incorrectly calculate the ToA for the SYNC packet as the ToA 1232, and not the ToA 1234.

The transmitter 1202 may continue to periodically transmit packets after transmitting the SYNC packet 1206. For example, the transmitter 1202 may transmit the SYNC/STS packet 1208 for the receiver 1222 to use for performing ranging. The SYNC/STS packet 1208 may be a SYNC packet with no security, or may be an STS packet encrypted using a private key known to the transmitter 1202 and the receiver 1222. Similar to the SYNC packet 1216, the spoofer 1212 may transmit the SYNC/STS packet 1218 before the transmitter 1202 transmits the SYNC/STS packet 1208, simulating a transmission by the transmitter 1202 in a location that is closer to the receiver 1222 than the transmitter 1202 is actually located. If the SYNC/STS packet 1208 is an STS packet, the spoofer may advance the SYNC/STS packet 1218 with random bits until it receives the SYNC/STS packet 1208 from the transmitter, and then may replay the bits of the SYNC/STS packet 1208 for the SYNC/STS packet 1218. The receiver 1222 may receive the SYNC/STS packet 1218 as the SYNC/STS packet 1228 at a time earlier than when the receiver 1222 receives the SYNC/STS packet 1208 from the transmitter 1202. If the SYNC/STS packet 1218 is an STS packet, the receiver 1222 may interpret the SYNC/STS packet 1228 as a noisy, but authentic transmission, as the later portion of the SYNC/STS packet 1228 is an authentic replay of the SYNC/STS packet 1208 from the transmitter 1202. As a result, the receiver 1222 may continue to incorrectly calculate the ToA for the SYNC/STS packet 1228.

In summary, the spoofer 1212 may achieve distance reduction using an SA manipulation technique for both the SYNC packet 1206 as well as the SYNC/STS packet 1208, even if the SYNC/STS packet 1208 includes an STS.

Figure 13:
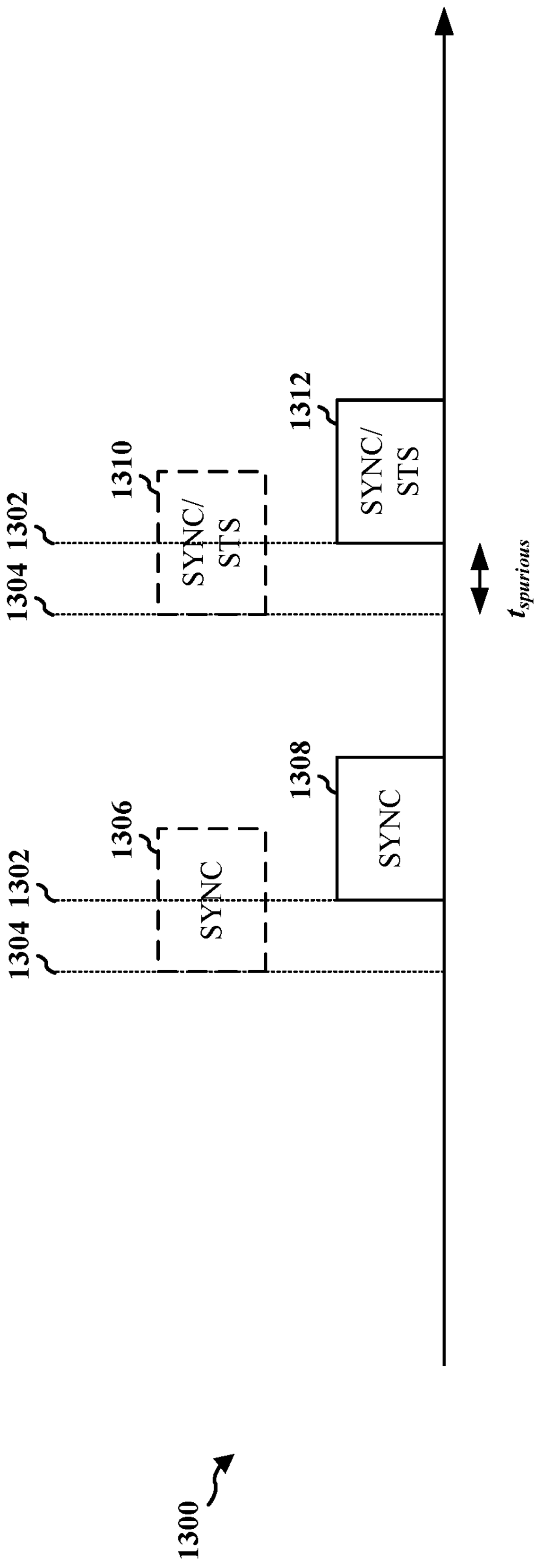
FIG. 13 is a diagram illustrating an example of timing for packets transmitted and received during a spoofing scenario during a ranging session between wireless devices.

FIG. 13 is a diagram 1300 illustrating an example of timing for packets received by a receiver wireless device during an SA manipulation spoofing scenario for a ranging session between wireless devices. A receiver wireless device, such as the receiver 1222 in FIG. 12, may first receive a spoofed SYNC packet 1306 at a time 1304 from a spoofer wireless device, such as the spoofer 1212 in FIG. 12. The receiver wireless device may then receive an authentic SYNC packet 1308 at a time 1302 from an authentic transmitter wireless device, such as the transmitter 1202 in FIG. 12. While the spoofed SYNC packet 1306 may be transmitted using a stronger power than the authentic SYNC packet 1308, if the receiver wireless device can identify the spoofed SYNC packet 1306 as a spurious signal, the receiver wireless device may filter out the spoofed SYNC packet 1306 as noise, particularly if the receiver wireless device knows the code sequence used by the spoofer. Even if the spoofer continues to transmit a spoofed SYNC/STS packet 1310 before the transmitter wireless device transmits the authentic SYNC/STS packet 1312, the receiver wireless device may continue to filter out the spoofed SYNC/STS packet 1310 based on its knowledge that a spoofer is transmitting spurious packets at a time 1304 before transmission of authentic packets at a time 1302.

Figure 14:
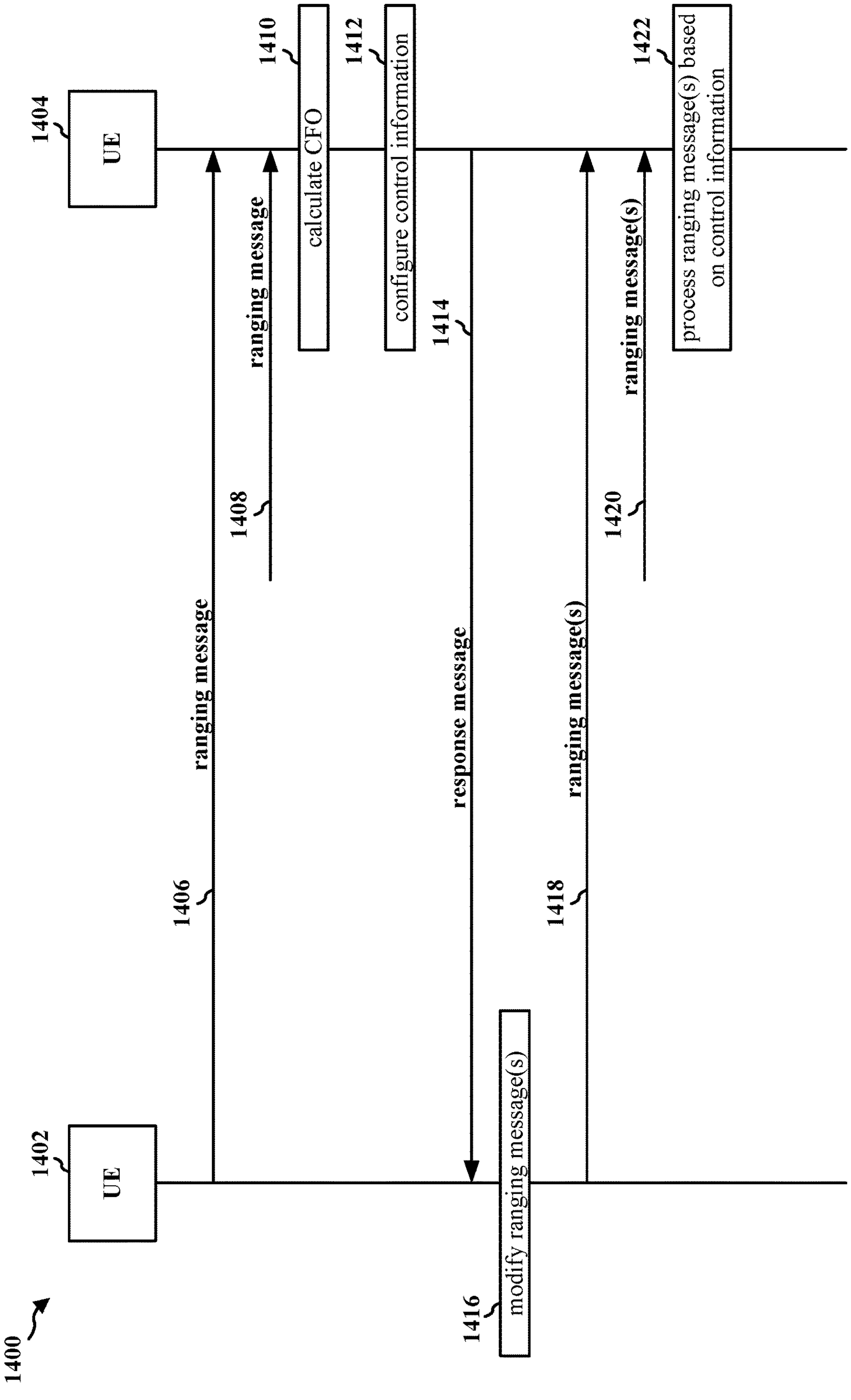
FIG. 14 is a connection flow diagram illustrating an example of wireless devices configured to detect and prevent security vulnerabilities for wireless positioning.

FIG. 14 is a connection flow diagram 1400 illustrating an example of a UE 1402 and a UE 1404 configured to detect and prevent security vulnerabilities for wireless positioning, for example the SA manipulation vulnerability illustrated in FIGS. 12 and 13. The UE 1402 may transmit a ranging message 1406 to the UE 1404. The UE 1404 may receive the ranging message 1406 from the UE 1402. The ranging message 1406 may be, for example, a RIM or an RRM. In other words, the UE 1402 may be an initiator transmitting an RIM to the UE 1404 as a responder, or the UE 1402 may be a responder transmitting an RRM in response to receiving an RIM from the UE 1404. In some aspects, the UE 1404 may be a controller, which transmits RCM or RCUM to the UE 1402 to configure, or modify, ranging between the UE 1402 and the UE 1404. The UE 1402 may be a controlee that receives configuration messages from the UE 1404. In other aspects the UE 1402 may be the controller, which transmits RCM or RCUM to the UE 1404 to configure, or modify, ranging between the UE 1402 and the UE 1404. The UE 1404 may be a controlee that receives configuration messages from the UE 1402. However, the UE 1404 may be configured, via an RCM or an RCUM from the UE 1402, to transmit an RRM with a payload that indicates that the UE 1402 modify its upcoming transmissions, as described further below. In some aspects, the ranging message 1406 may include an NB signal, such as the NB packet 1204 in FIG. 12. In some aspects, the ranging message 1406 may include an UWB signal, such as the SYNC packet 1206 in FIG. 12 or the SYNC/STS packet 1208 in FIG. 12.

The UE 1404 may receive at least one other ranging message, such as the ranging message 1408, from other devices, for example a spoofing device similar to the spoofer 1212 in FIG. 12. The ranging message 1408 may be a replay of the ranging message 1406 from the UE 1402 with altered attributes, for example an increased transmission power and/or an altered carrier frequency, which may cause the UE 1404 to incorrectly calculate its range relative to the UE 1402 if the UE 1404 bases its ranging on the ranging message 1408 instead of the ranging message 1406. Since the ranging message 1408 may be transmitted with a greater transmission power than the ranging message 1406, the ranging message 1408 may interfere with the UE 1404 receiving the ranging message 1406, negatively influencing the ability for the UE 1404 to measure the ranging message 1406. In some aspects, the ranging message 1408 may be transmitted before the ranging message 1406 is transmitted, for example during an SA manipulation attack.

At 1410, the UE 1404 may calculate a CFO of a received ranging message. The UE 1404 may compare the calculated CFO against a threshold (e.g., T1). The threshold may be a configured threshold based on a standard or received from a network device, or may be calculated based on previous ranging messages received from the UE 1402. In some aspects, if the calculated CFO is greater than or equal to the threshold value, at 1412, the UE 1404 may configure control information for the UE 1402. In other aspects, if the calculated CFO is greater than or equal to the threshold value (e.g., T1) a number of times that is greater than or equal to a second threshold value (e.g., T2), at 1412, the UE 1404 may configure control information for the UE 1402. In other words, a received ranging message may have an abnormally large CFO due to normal erratic behavior by the UE 1402, but if the erratic behavior persists over time (e.g., over two or over four ranging periods), the UE 1404 may determine that a spoofer is repeatedly transmitting a ranging message with an improperly large CFO. The UE 1404 may process ranging messages that have a calculated CFO that is less than or equal to a threshold value (e.g., CFO≤T1 or CFO<T1) and may ignore/skip/refrain from processing ranging messages that have a calculated CFO that is greater than or equal to the threshold value (e.g., CFO≥T1 or CFO>T1).

The UE 1404 may transmit a response message 1414 to the UE 1402. The response message 1414 may be an RCUM or an RRM. The response message 1414 may include the control information configured at 1412. The response message 1414 may include an indicator for the UE 1402 to modify its upcoming ranging messages in response to the UE 1404 detecting a potential security vulnerability. The response message 1414 may be an RCUM or an RRM with additional control information for the UE 1402 to modify its upcoming transmissions. The response message 1414 may be encoded with an STS and a payload.

The control information may include an indicator for the UE 1402 to transmit the set of ranging messages 1418 based on a set of code indices. The indicator may be, for example, an index to a set of code indices indicated in an RCM/RCUM transmitted by the UE 1402 to the UE 1404 (e.g., where the UE 1402 is the controller), or by the UE 1404 to the UE 1402 (e.g., where the UE 1404 is the controller). In some aspects, each of the set of code indices may be associated with a set of preamble symbols, for example a set of SYNC symbols or a set of STS symbols. In some aspects, each of the set of code indices may be drawn from a pseudo-random sequence, such as that each of the preamble symbols in the set of ranging messages 1418 is transmitted using a distinct, known, code index. In some aspects, the code index information may be represented by a code index. For example, with reference to Table 2, a code index may refer to the code index 4, which results in the codeword "0000+−00−00−++++0+−+000+0−0++0−" for that symbol. In some aspects, the code index information may be represented by a tuple ($p_{start}$, $p_{end}$, C), where the symbol indices in the range of ($p_{start}$,$p_{end}$) may use the codeword identified by c. For example, with reference to Table 2, a set of code indices may include three tuples defined by [(0, 8, 1) (9, 25, 2), (26, 30, 3)] which defines a first portion of a codeword with code index 1 defined by the range (0, 8) as "−0000+0−0." a second portion of the codeword with code index 2 defined by the range (9, 25) as "000−++0−+−−−00+00." and a third portion of the codeword with code index 3 defined by the range (26, 30) as "−0+0−," resulting in the codeword "−0000+0−0000−++0−+−−−00+00"−0+0−" for that symbol.

In one aspect, at 1416, the UE 1402 may modify the set of ranging messages 1418 based on the set of code indices. In some aspects, the set of code indices may include a single code index, such that UE 1402 transmits each of the set of ranging messages based on the single code index. In other aspects, the set of code indices may be drawn from a pseudo-random sequence, such that UE 1402 transmits each of the set of ranging messages based on a discrete, but known code index. For example, each of the set of ranging messages 1418 may be transmitted based on a code index indicated by the response message 1414. In another example, the set of ranging messages 1418 may each be transmitted based on a discrete code index of the set of code indices. The UE 1404 may receive the set of ranging messages 1418. At 1422, the UE 1404 may process the set of ranging messages 1418 based on the control information, for example by decoding and measuring messages that were encoded based on the indicated set of code indices, and by ignoring messages that were not encoded based on the indicated set of code indices. As such, if the UE 1404 receives other ranging messages, for example the set of ranging messages 1420, from a spoofing device, the UE 1404 may ignore/skip such messages. In some aspects, the UE 1404 may filter out the set of ranging messages 1420 based on a false indicator of a code index. For example, the ranging message 1406 may include an NB signal with an indication of a code index that is broadcasted in the NB packet. The UE 1404 may look for ranging messages encoded with the falsely indicated code index, allowing the UE 1404 to easily identify, and filter out, noise introduced by the spoofed set of ranging messages that may interfere with reception of the set of ranging messages 1418.

In another aspect, at 1416, the UE 1402 may encode a section of the preamble symbols (e.g., each symbol of a SYNC preamble or an STS preamble) for each of the set of ranging messages 1418 based on the set of code indices. In other words, the response message 1414 may indicate a plurality of code indices using tuples that indicate ranges for each preamble symbols, where each range correlates with a discrete code index. The UE 1402 may transmit each set of preamble symbols for each of the set of ranging messages 1418 based on a discrete, known, code index drawn from a pseudo-random sequence. For example, each set of preamble symbols of the set of ranging messages 1418 identified by the tuples in the response message 1414 may be encoded with a discrete code index. The UE 1404 may receive the set of ranging messages 1418. At 1422, the UE 1404 may process the set of ranging messages 1418 based on the control information, for example by decoding and measuring sections of the preambles of the set of ranging messages 1418 based on the set of tuples that correlate with the set of code indices, and by ignoring sections of the preambles of the set of ranging messages 1418 that were not encoded using the set of tuples that correlate with the set of code indices. In other words, the UE 1404 may perform a cross-correlation of a group of symbols in a preamble as indicated by the code index information. As such, if the UE 1404 receives other ranging messages, for example the set of ranging messages 1420, from a spoofing device, the UE 1404 may ignore/skip sections of such messages that were not encoded based on the set of code indices. In some aspects, the UE 1404 may identify the spurious ToA (e.g., $t_{spurious}$ in FIG. 13) by performing a cross-correlation with the entire preamble packet. The UE 1404 may identify the sequence transmitted by the UE 1402 based on a previously transmitted false indicator of a code index. Given an authentic ToA estimate, and prior knowledge of the start of the ranging slot configured for an upcoming ranging message, the UE 1404 may ignore/skip spurious transmissions as noise until the start of the expected ranging slot+calculated authentic ToA. The UE 1404 may be configured to not listen to the channel to conserve power until the calculated start, or may discard received samples before the cross-correlated start. In other aspects, the UE 1404 may discard/ignore advanced spurious transmissions based on an estimated spurious ToA calculated by the UE 1404.

Figure 15:
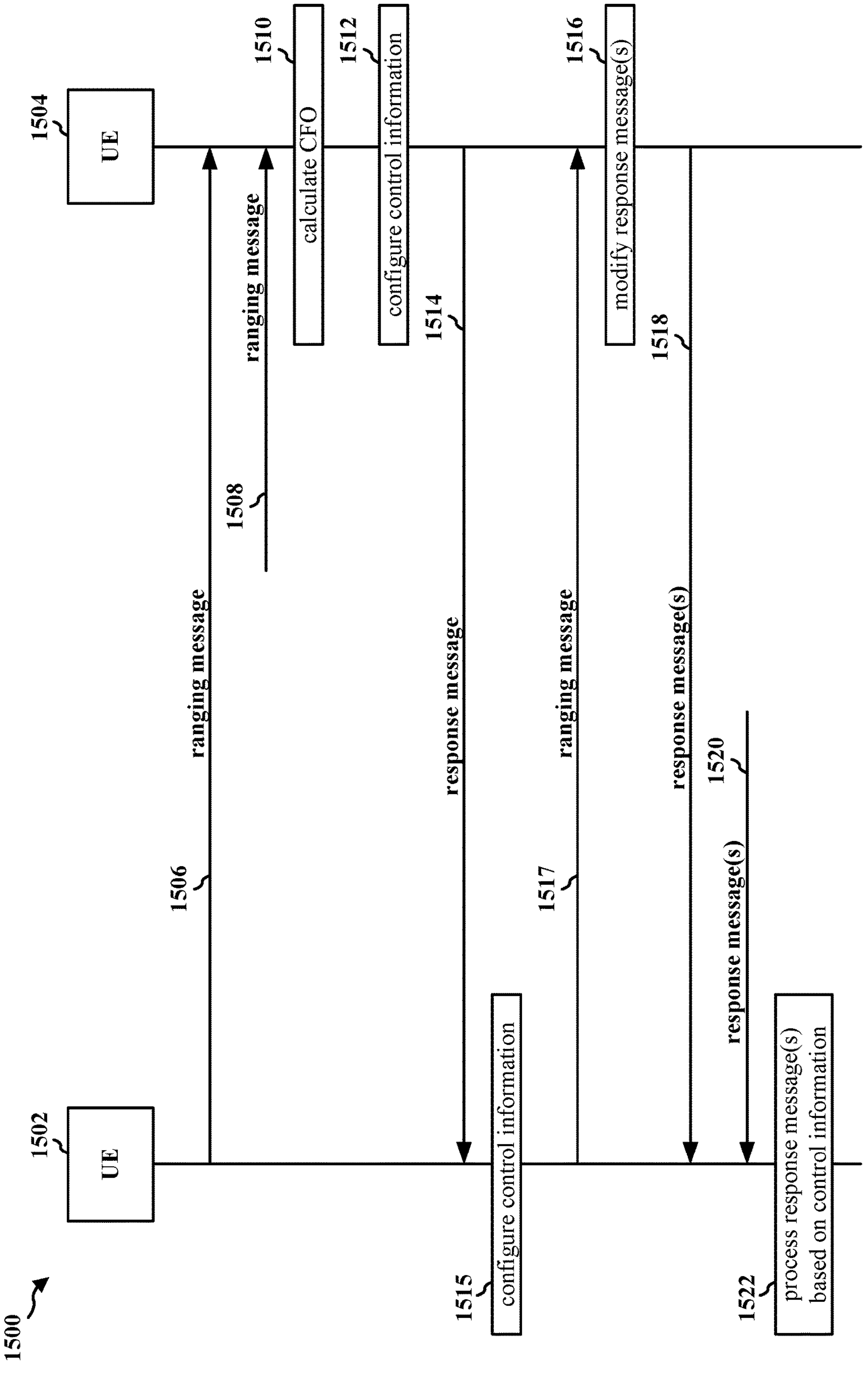
FIG. 15 is a connection flow diagram illustrating an example of wireless devices configured to detect and prevent security vulnerabilities for wireless positioning.

FIG. 15 is a connection flow diagram 1500 illustrating an example of a UE 1502 and a UE 1504 configured to detect and prevent security vulnerabilities for wireless positioning, for example the SA manipulation vulnerability illustrated in FIGS. 12 and 13. The UE 1502 may transmit a ranging message 1506 to the UE 1504. The UE 1504 may receive the ranging message 1506 from the UE 1502. The ranging message 1506 may be, for example, a RIM or an RRM. In other words, the UE 1502 may be an initiator transmitting an RIM to the UE 1504 as a responder, or the UE 1502 may be a responder transmitting an RRM in response to receiving an RIM from the UE 1504. In some aspects, the UE 1504 may be a controller, which transmits RCM or RCUM to the UE 1502 to configure, or modify, ranging between the UE 1502 and the UE 1504. The UE 1502 may be a controlee that receives configuration messages from the UE 1504. In other aspects the UE 1502 may be the controller, which transmits RCM or RCUM to the UE 1504 to configure, or modify, ranging between the UE 1502 and the UE 1504. The UE 1504 may be a controlee that receives configuration messages from the UE 1502. However, the UE 1504 may be configured, via an RCM or an RCUM from the UE 1502, to transmit an RRM with a payload that indicates that the UE 1502 modify its upcoming transmissions, as described further below. In some aspects, the ranging message 1506 may include an NB signal, such as the NB packet 1204 in FIG. 12. In some aspects, the ranging message 1506 may include an UWB signal, such as the SYNC packet 1206 in FIG. 12 or the SYNC/STS packet 1208 in FIG. 12.

The UE 1504 may receive at least one other ranging message, such as the ranging message 1508, from other devices, for example a spoofing device similar to the spoofer 1212 in FIG. 12. The ranging message 1508 may be a replay of the ranging message 1506 from the UE 1502 with altered attributes, for example an increased transmission power and/or an altered carrier frequency, which may cause the UE 1504 to incorrectly calculate its range relative to the UE 1502 if the UE 1504 bases its ranging on the ranging message 1508 instead of the ranging message 1506. Since the ranging message 1508 may be transmitted with a greater transmission power than the ranging message 1506, the ranging message 1508 may interfere with the UE 1504 receiving the ranging message 1506, negatively influencing the ability for the UE 1504 to measure the ranging message 1506. In some aspects, the ranging message 1508 may be transmitted before the ranging message 1506 is transmitted, for example during an SA manipulation attack.

At 1510, the UE 1504 may calculate a CFO of a received ranging message. The UE 1504 may compare the calculated CFO against a threshold (e.g., T1). The threshold may be a configured threshold based on a standard or received from a network device, or may be calculated based on previous ranging messages received from the UE 1502. In some aspects, if the calculated CFO is greater than or equal to the threshold value, at 1512, the UE 1504 may configure control information for the UE 1502. In other aspects, if the calculated CFO is greater than or equal to the threshold value (e.g., T1) a number of times that is greater than or equal to a second threshold value (e.g., T2), at 1512, the UE 1504 may configure control information for the UE 1502. In other words, a received ranging message may have an abnormally large CFO due to normal erratic behavior by the UE 1502, but if the erratic behavior persists over time (e.g., over two or over four ranging periods), the UE 1504 may determine that a spoofer is repeatedly transmitting a ranging message with an improperly large CFO. The UE 1504 may process ranging messages that have a calculated CFO that is less than or equal to a threshold value (e.g., $CFO \leq T1$ or $CFO < T1$) and may ignore/skip/refrain from processing ranging messages that have a calculated CFO that is greater than or equal to the threshold value (e.g., $CFO \geq T1$ or $CFO > T1$).

The UE 1504 may transmit a response message 1514 to the UE 1502. The response message 1514 may be an RCUM or an RRM. The response message 1514 may include the control information configured at 1512. The response message 1514 may include an indicator for the UE 1502 to modify its upcoming ranging messages in response to the UE 1504 detecting a potential security vulnerability. The response message 1514 may include an indicator for the UE 1502 to configure control information in response to the UE 1504 detecting a potential security vulnerability. The response message 1514 may be an RCUM or an RRM with additional control information for the UE 1502 to modify its upcoming transmissions. The response message 1514 may be encoded with an STS and a payload.

At 1515, the UE 1502 may configure control information for the UE 1504 in response to receiving an indicator that the UE 1504 has detected a potential security vulnerability. In other words, the UE 1504 may instruct the UE 1502 to generate control information for the UE 1504 to use based on the UE 1504 determining that there exists a potential security vulnerability. The UE 1502 to may transmit a ranging message 1517 to the UE 1504. The UE 1504 may receive the ranging message 1517 from the UE 1502. The ranging message 1517 may include the control information configured at 1515.

The control information may include an indicator for the UE 1504 to transmit the set of response messages 1518 based on a set of code indices. The indicator may be, for example, an index to a set of code indices indicated in an RCM/RCUM transmitted by the UE 1504 to the UE 1502 (e.g., where the UE 1504 is the controller), or by the UE 1502 to the UE 1504 (e.g., where the UE 1502 is the controller). In some aspects, each of the set of code indices may be associated with a set of preamble symbols, for example a set of SYNC symbols or a set of STS symbols. In some aspects, each of the set of code indices may be drawn from a pseudo-random sequence, such as that each of the preamble symbols in the set of response messages 1518 is transmitted using a distinct, known, code index. In some aspects, the code index information may be represented by a code index. For example, with reference to Table 2, a code index may refer to the code index 4, which results in the codeword "0000+–00–00–++++0+–+000+0–0++0–" for that symbol. In some aspects, the code index information may be represented by a tuple ($p_{start}$>$p_{end}$, C), where the symbol indices in the range of ($p_{start}$,$p_{end}$) may use the codeword identified by c. For example, with reference to Table 2, a set of code indices may include three tuples defined by [(0, 8, 1) (9, 25, 2), (26, 30, 3)] which defines a first portion of a codeword with code index 1 defined by the range (0, 8) as "–0000+0–0." a second portion of the codeword with code index 2 defined by the range (9, 25) as "000–++0–+–––00+00," and a third portion of the codeword with code index 3 defined by the range (26, 30) as "–0+0–," resulting in the codeword "–0000+0–0000–++0–+–––00+00"–0+0–" for that symbol.

In one aspect, at 1516, the UE 1504 may modify the set of response messages 1518 based on the set of code indices. In some aspects, the set of code indices may include a single code index, such that UE 1504 transmits each of the set of response messages based on the single code index. In other aspects, the set of code indices may be drawn from a pseudo-random sequence, such that UE 1504 transmits each of the set of response messages based on a discrete, but known code index. For example, each of the set of response messages 1518 may be transmitted based on a code index indicated by the ranging message 1517. In another example, the set of response messages 1518 may each be transmitted based on a discrete code index of the set of code indices. The UE 1504 may receive the set of response messages 1518. At 1522, the UE 1502 may process the set of response messages 1518 based on the control information configured at 1515, for example by decoding and measuring messages that were encoded based on the indicated set of code indices, and by ignoring messages that were not encoded based on the indicated set of code indices. As such, if the UE 1502 receives other response messages, for example the set of response messages 1520, from a spoofing device, the UE 1502 may ignore/skip such messages. In some aspects, the UE 1502 may filter out the set of response messages 1520 based on a false indicator of a code index. For example, the response message 1514 may include an NB signal with an indication of a code index that is broadcasted in the NB packet. The UE 1502 may look for ranging messages encoded with the falsely indicated code index, allowing the UE 1502 to easily identify, and filter out, noise introduced by the spoofed set of ranging messages that may interfere with reception of the set of response messages 1518.

In another aspect, at 1516, the UE 1504 may encode a section of the preamble symbols (e.g., each symbol of a SYNC preamble or an STS preamble) for each of the set of response messages 1518 based on the set of code indices. In other words, the ranging message 1517 may indicate a plurality of code indices using tuples that indicate ranges for each preamble symbols, where each range correlates with a discrete code index. The UE 1504 may transmit each set of preamble symbols for each of the set of response messages 1518 based on a discrete, known, code index drawn from a pseudo-random sequence. For example, each set of preamble symbols of the set of response messages 1518 identified by the tuples in the ranging message 1517 may be encoded with a discrete code index. The UE 1502 may receive the set of response messages 1518. At 1522, the UE 1502 may process the set of response messages 1518 based on the control information, for example by decoding and measuring sections of the preambles of the set of response messages 1518 based on the set of tuples that correlate with the set of code indices, and by ignoring sections of the preambles of the set of response messages 1518 that were not encoded using the set of tuples that correlate with the set of code indices. In other words, the UE 1502 may perform a cross-correlation of a group of symbols in a preamble as indicated by the code index information. As such, if the UE 1502 receives other response messages, for example the set of response messages 1520, from a spoofing device, the UE 1502 may ignore/skip sections of such messages that were not encoded based on the set of code indices. In some aspects, the UE 1502 may identify the spurious ToA (e.g., $t_{spurious}$ in FIG. 13) by performing a cross-correlation with the entire preamble packet. The UE 1502 may identify the sequence transmitted by the UE 1504 based on a previously transmitted false indicator of a code index. Given an authentic ToA estimate, and prior knowledge of the start of the ranging slot configured for an upcoming ranging message, the UE 1502 may ignore/skip spurious transmissions as noise until the start of the expected ranging slot+calculated authentic ToA. The UE 1502 may be configured to not listen to the channel to conserve power until the calculated start, or may discard received samples before the cross-correlated start. In other aspects, the UE 1502 may discard/ignore advanced spurious transmissions based on an estimated spurious ToA calculated by the UE 1502.

Figure 16:
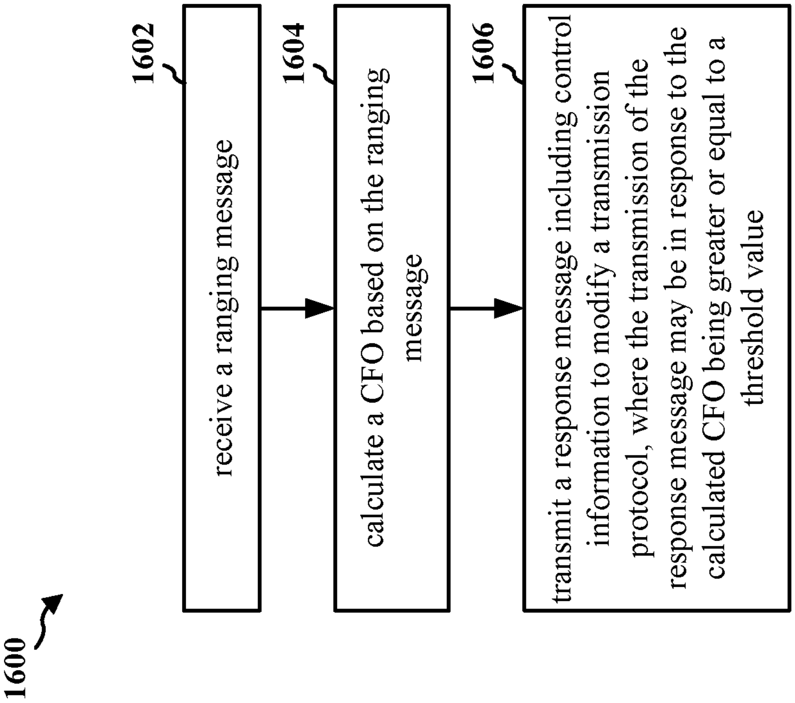
FIG. 16 is a flowchart of a method of wireless communication.

FIG. 16 is a flowchart 1600 of a method of wireless communication. The method may be performed by a UE (e.g., the UE 104, the UE 310, the UE 350, the UE 502, the UE 504, the UE 552, the UE 554, the UE 1004, the UE 1404; the wireless device 404; the initiator 906; the apparatus 2204). At 1602, the UE may receive a ranging message. For example, 1602 may be performed by the UE 1404 in FIG. 14, which may receive the ranging message 1406 from the UE 1402. Moreover, 1602 may be performed by the component 198 in FIG. 1, 3, or 22.

In some aspects, the UE may transmit a first RIM to initiate a positioning session. The first ranging message may include an RRM. The reception of the RRM may be in response to the transmission of the RIM. For example, the UE 1404 in FIG. 14 may transmit a first RIM to the UE 1402 to initiate a positioning session. The ranging message 1406 may be an RRM that is transmitted by the UE 1402 in response to the UE 1402 receiving the RIM from the UE 1402.

In some aspects, the ranging message may include an RIM or an RRM. For example, the ranging message 1406 may be an RIM or an RRM.

At 1604, the UE may calculate a CFO based on the ranging message. For example, 1604 may be performed by the UE 1404 in FIG. 14, which may, at 1410, calculate a CFO based on the ranging message 1406. Moreover, 1604 may be performed by the component 198 in FIG. 1, 3, or 22.

At 1606, the UE may transmit a response message including control information to modify a transmission protocol. The transmission of the response message may be in response to the calculated CFO being greater or equal to a threshold value. The transmission of the response message may be in response to the calculated CFO being greater than or equal to the threshold value a second threshold number of times. The response message may be an RCUM or an RRM. For example, 1606 may be performed by the UE 1404 in FIG. 14, which may transmit the response message 1414 to the UE 1402. The response message 1414 may include control information for the UE 1402 to modify a transmission protocol for the set of ranging messages 1418. The transmission of the response message 1414 may be in response to the calculated CFO at 1410 being greater or equal to a threshold value (e.g., T1). The response message 1414 may be an RCUM or an RRM. Moreover, 1606 may be performed by the component 198 in FIG. 1, 3, or 22.

Figure 17:
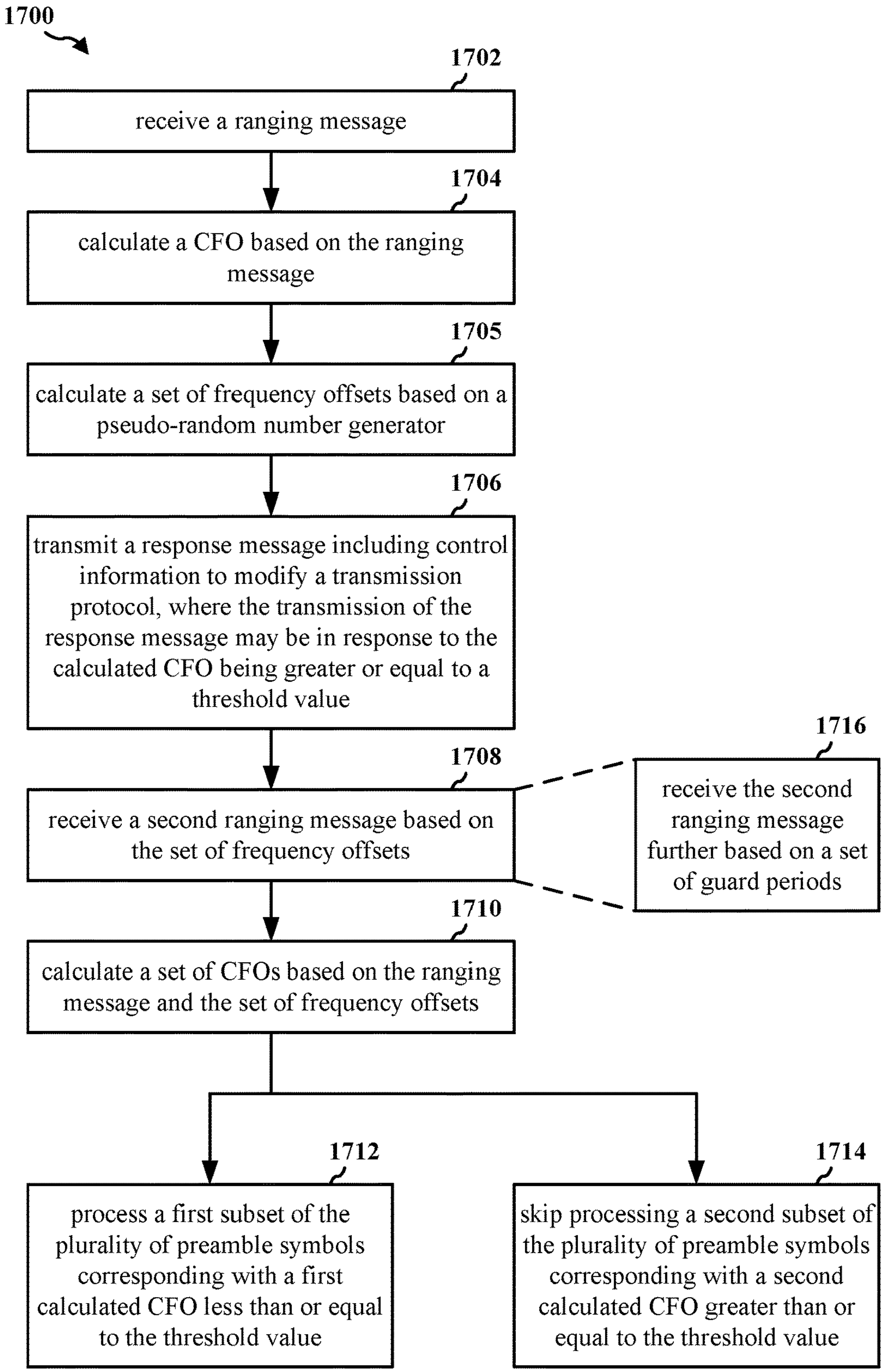
FIG. 17 is a flowchart of a method of wireless communication.

FIG. 17 is a flowchart 1700 of a method of wireless communication. The method may be performed by a UE (e.g., the UE 104, the UE 310, the UE 350, the UE 502, the UE 504, the UE 552, the UE 554, the UE 1004, the UE 1004; the wireless device 404; the initiator 906; the apparatus 2204). At 1702, the UE may receive a ranging message. For example, 1702 may be performed by the UE 1004 in FIG. 10, which may receive the ranging message 1006 from the UE 1002. Moreover, 1702 may be performed by the component 198 in FIG. 1, 3, or 22.

At 1704, the UE may calculate a CFO based on the ranging message. For example, 1704 may be performed by the UE 1004 in FIG. 10, which may, at 1010, calculate a CFO based on the ranging message 1006. Moreover, 1704 may be performed by the component 198 in FIG. 1, 3, or 22.

At 1705, the UE may calculate a set of frequency offsets based on a pseudo-random number generator. For example, 1705 may be performed by the UE 1004 in FIG. 10, which may, at 1012, calculate a set of frequency offsets based on a pseudo-random number generator. Moreover, 1705 may be performed by the component 198 in FIG. 1.3, or 22.

At 1706, the UE may transmit a response message including control information to modify a transmission protocol. The control information may include the set of frequency offsets calculated at 1705. The transmission of the response message may be in response to the calculated CFO being greater or equal to a threshold value. For example, 1706 may be performed by the UE 1004 in FIG. 10, which may transmit the response message 1014 to the UE 1002. The response message 1014 may include control information for the UE 1002 to modify a transmission protocol for the set of ranging messages 1018. The control information may include the set of frequency offsets calculated at 1705. The transmission of the response message 1014 may be in response to the calculated CFO at 1010 being greater or equal to a threshold value (e.g., T1). Moreover, 1706 may be performed by the component 198 in FIG. 1, 3, or 22.

At 1708, the UE may receive a second ranging message based on the set of frequency offsets. The second ranging message may include a plurality of preamble symbols. Each of the plurality of preamble symbols may correspond with a different frequency offset of the set of frequency offsets. For example, 1708 may be performed by the UE 1004 in FIG. 10, which may receive the set of ranging messages 1018 based on the set of frequency offsets in the response message 1014. The second ranging message may include a plurality of preamble symbols. Each of the plurality of preamble symbols may correspond with a different frequency offset of the set of frequency offsets. In other words, each preamble symbol may be transmitted by the UE 1002 with a different frequency offset of the set of frequency offsets. Moreover, 1708 may be performed by the component 198 in FIG. 1, 3, or 22.

At 1710, the UE may calculate a set of CFOs based on the ranging message and the set of frequency offsets. For example, 1710 may be performed by the UE 1004 in FIG. 10, which may, at 1022 calculate a set of CFOs based on the set of ranging messages 1018 and the set of frequency offsets in the response message 1014. Moreover, 1710 may be performed by the component 198 in FIG. 1, 3, or 22.

At 1712, the UE may process a first subset of the plurality of preamble symbols corresponding with a first calculated CFO less than or equal to the threshold value. For example, 1712 may be performed by the UE 1004 in FIG. 10, which may, at 1022 process a first subset of the plurality of preamble symbols from each of the set of ranging messages 1018 corresponding with a first calculated CFO less than or equal to the threshold value (e.g., CFO<x or CFO≤x). Moreover, 1712 may be performed by the component 198 in FIG. 1, 3, or 22.

At 1714, the UE may skip or refrain from processing a second subset of the plurality of preamble symbols corresponding with a second calculated CFO greater than or equal to the threshold value. For example, 1714 may be performed by the UE 1004 in FIG. 10, which may, at 1022, skip or refrain from processing a second subset of the plurality of preamble symbols from each of the set of ranging messages 1018 corresponding with a second calculated CFO greater than or equal to the threshold value (e.g., CFO>x or CFO≥x. Moreover, 1714 may be performed by the component 198 in FIG. 1, 3, or 22.

At 1716, the UE may receive a second ranging message based on the set of frequency offsets by receiving the second ranging message further based on a set of guard periods. The control information may include an indicator of the set of guard periods. For example, 1716 may be performed by the UE 1004 in FIG. 10, which may receive the set of ranging messages 1018 further based on a set of guard periods. The control information included in the response message 1014 may include an indicator of the set of guard periods. In other words, the UE 1002 may pad the preamble symbols of at least one of the set of ranging messages 1018 with the set of guard periods for carrier switching. Moreover, 1716 may be performed by the component 198 in FIG. 1,3, or 22.

Figure 18:
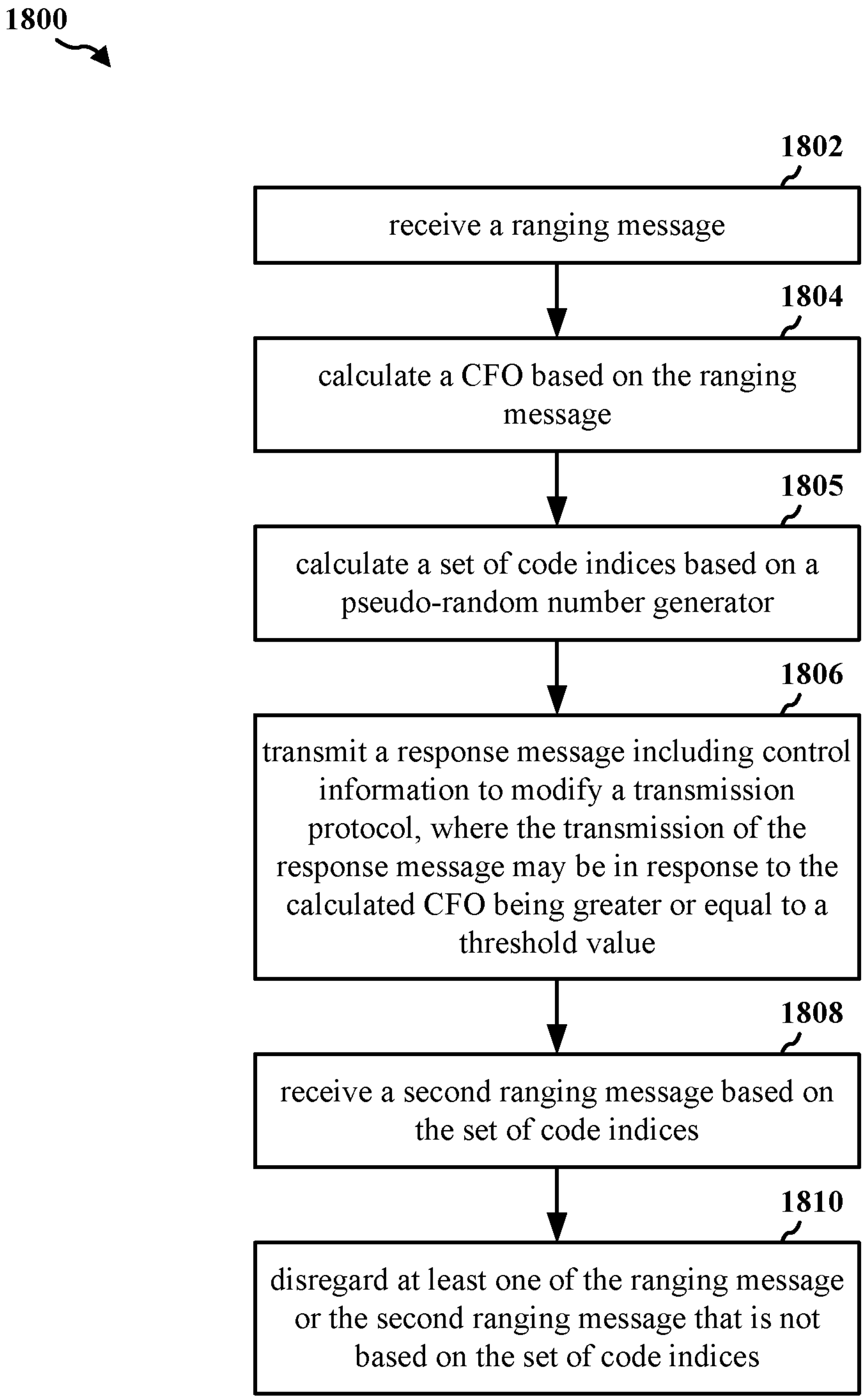
FIG. 18 is a flowchart of a method of wireless communication.

FIG. 18 is a flowchart 1800 of a method of wireless communication. The method may be performed by a UE (e.g., the UE 104, the UE 310, the UE 350, the UE 502, the UE 504, the UE 552, the UE 554, the UE 1004, the UE 1404; the wireless device 404; the initiator 906; the apparatus 2204). At 1802, the UE may receive a ranging message. For example, 1802 may be performed by the UE 1404 in FIG. 14, which may receive the ranging message 1406 from the UE 1402. Moreover, 1802 may be performed by the component 198 in FIG. 1, 3, or 22.

At 1804, the UE may calculate a CFO based on the ranging message. For example, 1804 may be performed by the UE 1404 in FIG. 14, which may, at 1410, calculate a CFO based on the ranging message 1406. Moreover, 1804 may be performed by the component 198 in FIG. 1, 3, or 22.

At 1805, the UE may calculate a set of code indices based on a pseudo-random number generator. For example, 1805 may be performed by the UE 1404 in FIG. 14, which may, at 1412, calculate a set of code indices based on a pseudo-random number generator. Moreover, 1805 may be performed by the component 198 in FIG. 1, 3, or 22.

At 1806, the UE may transmit a response message including control information to modify a transmission protocol. The control information may include the set of code indices calculated at 1805. The transmission of the response message may be in response to the calculated CFO being greater or equal to a threshold value. For example, 1806 may be performed by the UE 1404 in FIG. 14, which may transmit the response message 1414 to the UE 1402. The response message 1414 may include control information for the UE 1402 to modify a transmission protocol for the set of ranging messages 1418. The control information may include the set of code indices calculated at 1805. The transmission of the response message 1414 may be in response to the calculated CFO at 1410 being greater or equal to a threshold value (e.g., T1). Moreover, 1806 may be performed by the component 198 in FIG. 1, 3, or 22.

At 1808, the UE may receive a second ranging message based on the set of code indices. The second ranging message may include a plurality of sets of preamble symbols. Each of the plurality of sets of preamble symbols may correspond with a different code index of the set of code indices. Each code index of the set of code indices may include a tuple including (a) a first indicator of start of an index, (b) a second indicator of an end of an index, or (c), a third indicator of a code to use between the start and the end of the index. For example, 1808 may be performed by the UE 1404 in FIG. 14, which may receive the set of ranging messages 1418 based on the set of code indices. One of the set of ranging messages 1418 may include a plurality of sets of preamble symbols. Each of the plurality of sets of preamble symbols may correspond with a different code index of the set of code indices. Each code index of the set of code indices may include a tuple including (a) a first indicator of start of an index, (b) a second indicator of an end of an index, or (c), a third indicator of a code to use between the start and the end of the index (e.g., $(p_{start}, p_{end}, c)$). Moreover, 1808 may be performed by the component 198 in FIG. 1, 3, or 22.

At 1810, the UE may disregard at least one of the ranging message or the second ranging message that is not based on the set of code indices. For example, 1810 may be performed by the UE 1404 in FIG. 14, which may, at 1422, disregard at least one of the set of ranging messages 1418 that is not based on the set of code indices. Moreover, 1810 may be performed by the component 198 in FIG. 1, 3, or 22.

Figure 19:
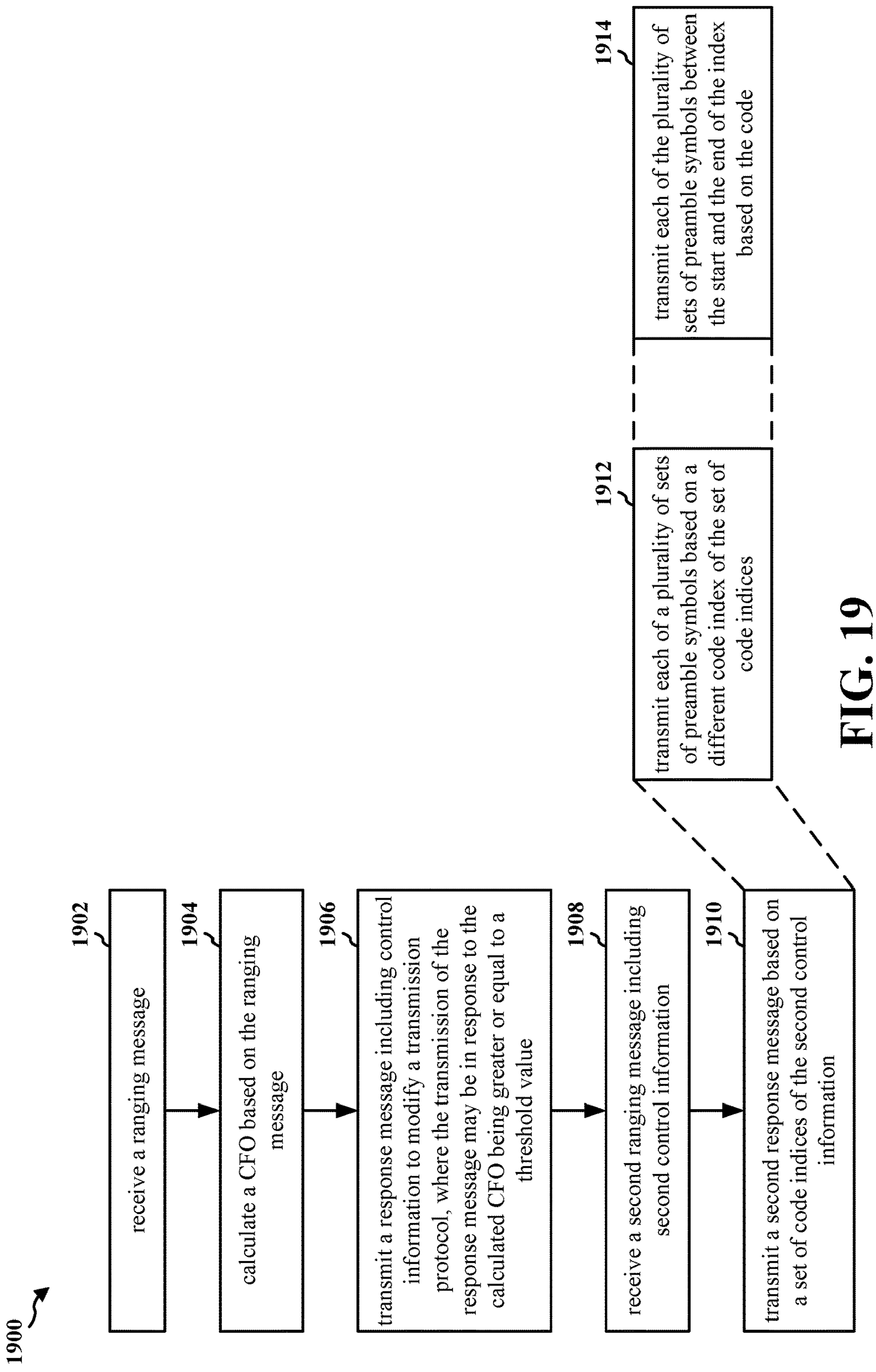
FIG. 19 is a flowchart of a method of wireless communication.

FIG. 19 is a flowchart 1900 of a method of wireless communication. The method may be performed by a UE (e.g., the UE 104, the UE 310, the UE 350, the UE 502, the UE 504, the UE 552, the UE 554, the UE 1004, the UE 1504; the wireless device 404; the initiator 906; the apparatus 2204). At 1902, the UE may receive a ranging message. For example, 1902 may be performed by the UE 1504 in FIG. 15, which may receive the ranging message 1506 from the UE 1502. Moreover, 1902 may be performed by the component 198 in FIG. 1, 3, or 22.

At 1904, the UE may calculate a CFO based on the ranging message. For example, 1904 may be performed by the UE 1504 in FIG. 15, which may, at 1510, calculate a CFO based on the ranging message 1506. Moreover, 1904 may be performed by the component 198 in FIG. 1, 3, or 22.

At 1906, the UE may transmit a response message including control information to modify a transmission protocol. The control information may include an indicator to modify the transmission protocol. The transmission of the response message may be in response to the calculated CFO being greater or equal to a threshold value. For example, 1906 may be performed by the UE 1504 in FIG. 15, which may transmit the response message 1514 to the UE 1502. The response message 1514 may include control information for the UE 1502 to modify a transmission protocol for the set of response messages 1518. The control information may include an indicator for the UE 1502 to modify the transmission protocol. The transmission of the response message 1514 may be in response to the calculated CFO at 1510 being greater or equal to a threshold value (e.g., T1). Moreover, 1906 may be performed by the component 198 in FIG. 1, 3, or 22.

At 1908, the UE may receive a second ranging message including second control information. The second control information may include a set of code indices. For example, 1908 may be performed by the UE 1504 in FIG. 15, which may receive the ranging message 1517 from the UE 1502 including another set of control information. The other set of control information may include a set of code indices. Moreover, 1908 may be performed by the component 198 in FIG. 1, 3, or 22.

At 1910, the UE may transmit a second response message based on a set of code indices of the second control information. Each code index of the set of code indices may include a tuple including (a) a first indicator of a start of an index. (b) a second indicator of an end of the index, and (c) a third indicator of a code. For example, 1910 may be performed by the UE 1504 in FIG. 15, which may transmit the set of response messages 1518 based on the set of code indices indicated in the ranging message 1517. Moreover, 1910 may be performed by the component 198 in FIG. 1, 3, or 22.

At 1912, the UE may transmit a second response message by transmitting each of a plurality of sets of preamble symbols based on a different code index of the set of code indices. For example, 1912 may be performed by the UE 1504 in FIG. 15, which may transmit, for each of the set of response messages 1518, each of a plurality of sets of preamble symbols based on a different code index of the set of code indices. Moreover, 1912 may be performed by the component 198 in FIG. 1, 3, or 22.

At 1914, the UE may transmit each of the plurality of sets of preamble symbols by transmitting each of the plurality of sets of preamble symbols between the start and the end of the index based on the code. For example, 1914 may be performed by the UE 1504 in FIG. 15, which may transmit each of the plurality of sets of preamble symbols of the set of response messages 1518 between the start and the end of the index based on the code. Moreover, 1914 may be performed by the component 198 in FIG. 1, 3, or 22.

Figure 20:
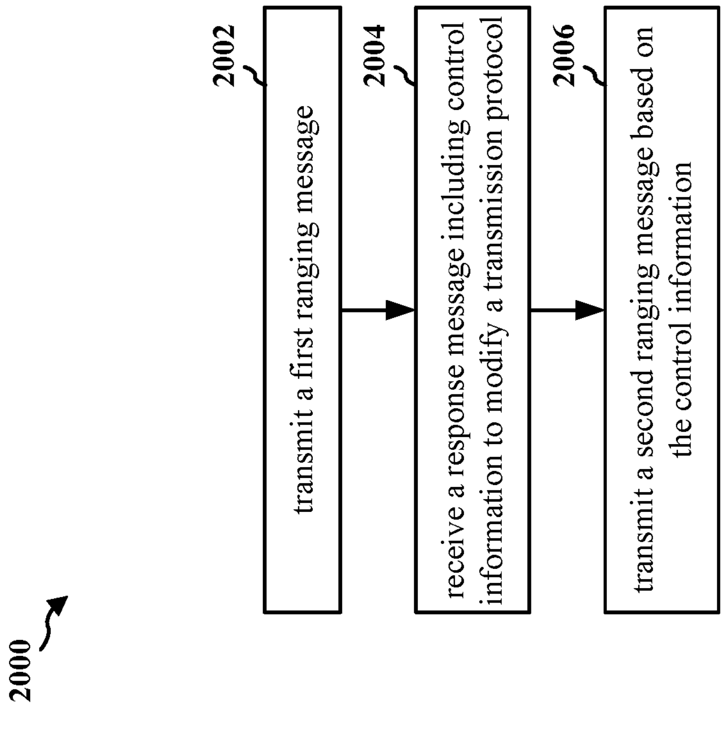
FIG. 20 is a flowchart of a method of wireless communication.

FIG. 20 is a flowchart 2000 of a method of wireless communication. The method may be performed by a UE (e.g., the UE 104, the UE 310, the UE 350, the UE 502, the UE 504, the UE 552, the UE 554, the UE 1002, the UE 1402; the wireless device 404; the responder 902; the apparatus 2204). At 2002, the UE may transmit a first ranging message. For example, 2002 may be performed by the UE 1402 in FIG. 14, which may transmit the ranging message 1406 to the UE 1404. Moreover, 2002 may be performed by the component 199 in FIG. 1, 3, or 22.

At 2004, the UE may receive a response message including control information to modify a transmission protocol. For example, 2004 may be performed by the UE 1402 in FIG. 14, which may receive the response message 1414 from the UE 1404. The response message 1414 may include control information to modify a transmission protocol for the set of ranging messages 1418. Moreover, 2004 may be performed by the component 199 in FIG. 1, 3, or 22.

At 2006, the UE may transmit a second ranging message based on the control information. For example, 2006 may be performed by the UE 1402 in FIG. 14, which may transmit the set of ranging messages 1418 based on the control information in the response message 1414. Moreover, 2006 may be performed by the component 199 in FIG. 1, 3, or 22.

Figure 21:
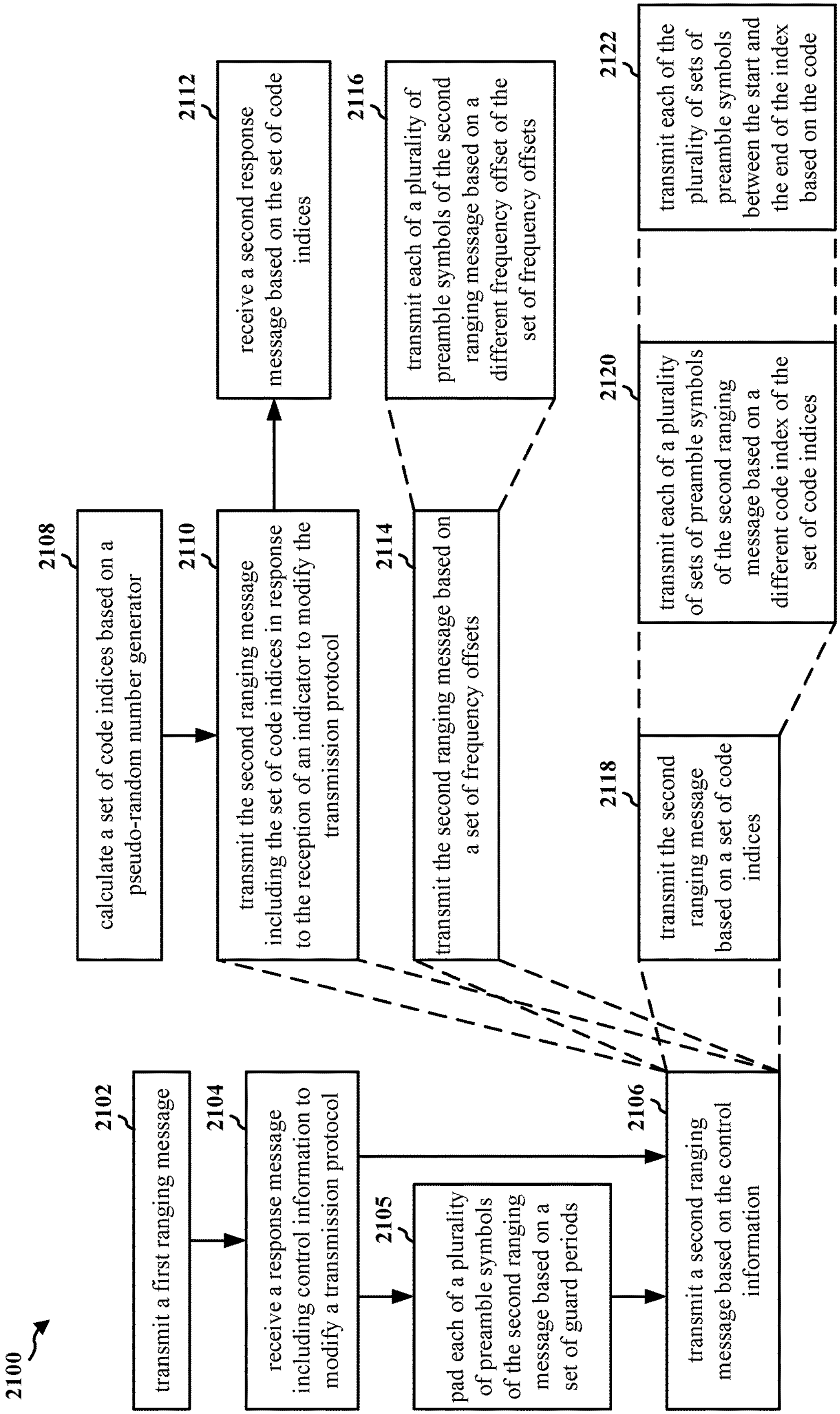
FIG. 21 is a flowchart of a method of wireless communication.

FIG. 21 is a flowchart 2100 of a method of wireless communication. The method may be performed by a UE (e.g., the UE 104, the UE 310, the UE 350, the UE 502, the UE 504, the UE 552, the UE 554, the UE 1002, the UE 1402; the wireless device 404; the responder 902; the apparatus 2204). At 2102, the UE may transmit a first ranging message. For example, 2102 may be performed by the UE 1402 in FIG. 14, which may transmit the ranging message 1406 to the UE 1404. Moreover, 2102 may be performed by the component 199 in FIG. 1, 3, or 22.

At 2104, the UE may receive a response message including control information to modify a transmission protocol. For example, 2104 may be performed by the UE 1402 in FIG. 14, which may receive the response message 1414 from the UE 1404. The response message 1414 may include control information to modify a transmission protocol for the set of ranging messages 1418. Moreover, 2104 may be performed by the component 199 in FIG. 1, 3, or 22.

At 2105, the UE may pad each of a plurality of preamble symbols of the second ranging message based on a set of guard periods. The second ranging message may include a plurality of preamble symbols. The control information may include an indicator of the set of guard periods. For example, 2105 may be performed by the UE 1402 in FIG. 14, which, at 1416, may pad each of a plurality of preamble symbols of the set of ranging messages 1418 based on a set of guard periods. The set of ranging messages 1418 may include the plurality of preamble symbols. The control information of the response message 1414 may include an indicator of the set of guard periods. Moreover, 2105 may be performed by the component 199 in FIG. 1, 3, or 22.

At 2106, the UE may transmit a second ranging message based on the control information. For example, 2106 may be performed by the UE 1402 in FIG. 14, which may transmit the set of ranging messages 1418 based on the control information in the response message 1414. Moreover, 2106 may be performed by the component 199 in FIG. 1, 3, or 22.

At 2108, the UE may calculate a set of code indices based on a pseudo-random number generator. For example, 2108 may be performed by the UE 1502 in FIG. 15, which may, at 1515, calculate a set of code indices based on a pseudo-random number generator. Moreover, 2108 may be performed by the component 199 in FIG. 1, 3, or 22.

At 2110, the UE may transmit the second ranging message based on the control information by transmitting the second ranging message including the set of code indices in response to the reception of an indicator to modify the transmission protocol. The control information may include the indicator to modify the transmission protocol. For example, 2110 may be performed by the UE 1502 in FIG. 15, which may transmit the ranging message 1517 including the set of code indices in response to the reception of the indicator to modify the transmission protocol. The response message 1514 may include the indicator to modify the transmission protocol. Moreover, 2110 may be performed by the component 199 in FIG. 1, 3, or 22.

At 2112, the UE may receive a second response message based on the set of code indices. The second response message may include a plurality of sets of preamble symbols. Each of the plurality of sets of preamble symbols may correspond with a different code index of the set of code indices. Each code index of the set of code indices may include a tuple including (a) a first indicator of a start of an index, (b) a second indicator of an end of the index, and (c) a third indicator of a code to use between the start and the end of the index. For example, 2112 may be performed by the UE 1502 in FIG. 15, which may receive a set of response messages 1518 based on the set of code indices. The set of response messages 1518 may include a plurality of sets of preamble symbols. Each of the plurality of sets of preamble symbols may correspond with a different code index of the set of code indices. Moreover, 2112 may be performed by the component 199 in FIG. 1, 3, or 22.

At 2114, the UE may transmit the second ranging message based on the control information by transmitting the second ranging message based on a set of frequency offsets. The control information may include a set of frequency offsets. For example, 2114 may be performed by the UE 1402 in FIG. 14, which may transmit the set of ranging messages 1418 based on a set of frequency offsets. The control information indicated in the response message 1414 may include an indicator of the set of frequency offsets. Moreover, 2114 may be performed by the component 199 in FIG. 1.3, or 22.

At 2116, the UE may transmit the second ranging message based on a set of frequency offsets by transmitting each of a plurality of preamble symbols of the second ranging message based on a different frequency offset of the set of frequency offsets. For example, 2116 may be performed by the UE 1402 in FIG. 14, which may transmit each of a plurality of preamble symbols of the set of ranging messages 1418 based on a different frequency offset of the set of frequency offsets. Moreover, 2116 may be performed by the component 199 in FIG. 1, 3, or 22.

At 2118, the UE may transmit the second ranging message based on the control information transmitting the second ranging message based on a set of code indices. The control information may include an indicator of the set of code indices. For example, 2118 may be performed by the UE 1402 in FIG. 14, which may transmit the second ranging message based on a set of code indices. The control information in the response message 1414 may include an indicator of the set of code indices. Moreover, 2118 may be performed by the component 199 in FIG. 1, 3, or 22.

At 2120, the UE may transmit the second ranging message based on a set of code indices by transmitting each of a plurality of sets of preamble symbols of the second ranging message based on a different code index of the set of code indices. For example, 2120 may be performed by the UE 1402 in FIG. 14, which may transmit each of a plurality of sets of preamble symbols of the set of ranging messages 1418 based on a different code index of the set of code indices. Moreover, 2120 may be performed by the component 199 in FIG. 1, 3, or 22.

At 2122, the UE may transmit each of the plurality of sets of preamble symbols of the second ranging message by transmitting each of the plurality of sets of preamble symbols between the start and the end of the index based on the code. For example, 2122 may be performed by the UE 1402 in FIG. 14, which may transmit each of the plurality of sets of preamble symbols of the set of ranging messages 1418 between the start and the end of the index based on the code. Moreover, 2122 may be performed by the component 199 in FIG. 1, 3, or 22.

Figure 22:
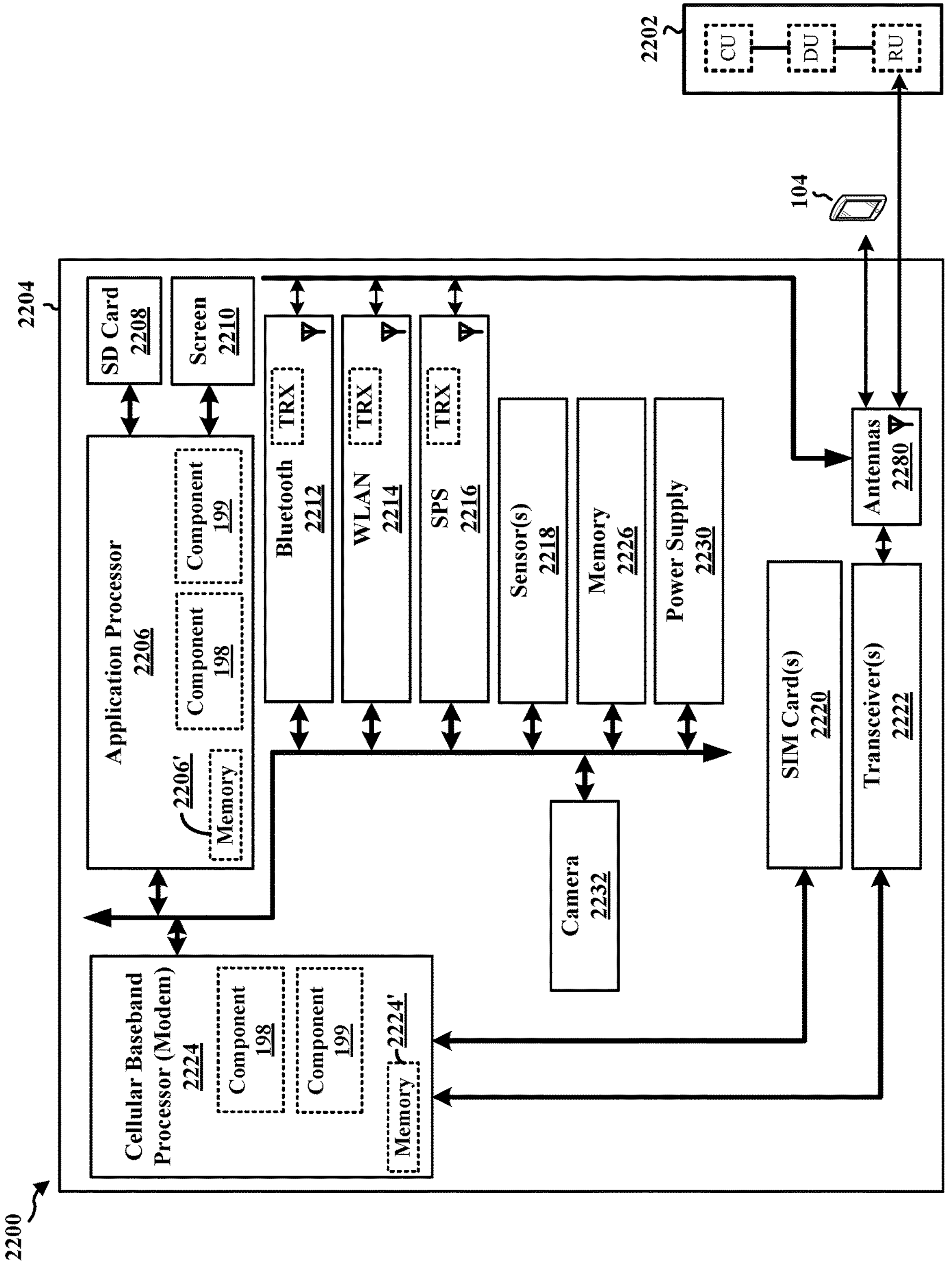
FIG. 22 is a diagram illustrating an example of a hardware implementation for an example apparatus and/or network entity.

FIG. 22 is a diagram 2200 illustrating an example of a hardware implementation for an apparatus 2204. The apparatus 2204 may be a UE, a component of a UE, or may implement UE functionality. In some aspects, the apparatus 2204 may include at least one cellular baseband processor 2224 (also referred to as a modem) coupled to one or more transceivers 2222 (e.g., cellular RF transceiver). The cellular baseband processor(s) 2224 may include at least one on-chip memory 2224'. In some aspects, the apparatus 2204 may further include one or more subscriber identity modules (SIM) cards 2220 and at least one application processor 2206 coupled to a secure digital (SD) card 2208 and a screen 2210. The application processor(s) 2206 may include on-chip memory 2206'. In some aspects, the apparatus 2204 may further include a Bluetooth module 2212, a WLAN module 2214, an SPS module 2216 (e.g., GNSS module), one or more sensor modules 2218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, a power supply 2230, and/or a camera 2232. The Bluetooth module 2212, the WLAN module 2214, and the SPS module 2216 may include an on-chip transceiver (TRX) (or in some cases, just a receiver (RX)). The Bluetooth module 2212, the WLAN module 2214, and the SPS module 2216 may include their own dedicated antennas and/or utilize the antennas 2280 for communication. The cellular baseband processor(s) 2224 communicates through the transceiver(s) 2222 via one or more antennas 2280 with the UE 104 and/or with an RU associated with a network entity 2202. The cellular baseband processor(s) 2224 and the application processor(s) 2206 may each include a computer-readable medium/memory 2224', 2206', respectively. The additional memory modules 2226 may also be considered a computer-readable medium/memory. Each computer-readable medium/memory 2224', 2206', 2226 may be non-transitory. The cellular baseband processor(s) 2224 and the application processor(s) 2206 are each responsible for general processing, including the execution of software stored on the computer-readable medium/memory. The software, when executed by the cellular baseband processor(s) 2224/application processor(s) 2206, causes the cellular baseband processor(s) 2224/application processor(s) 2206 to perform the various functions described supra. The cellular baseband processor(s) 2224 and the application processor(s) 2206 are configured to perform the various functions described supra based at least in part of the information stored in the memory. That is, the cellular baseband processor(s) 2224 and the application processor(s) 2206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2224/application processor(s) 2206 when executing software. The cellular baseband processor(s) 2224/application processor(s) 2206 may be a component of the UE 350 and may include the at least one memory 360 and/or at least one of the TX processor 368, the RX processor 356, and the controller/processor 359. In one configuration, the apparatus 2204 may be at least one processor chip (modem and/or application) and include just the cellular baseband processor(s) 2224 and/or the application processor(s) 2206, and in another configuration, the apparatus 2204 may be the entire UE (e.g., see UE 350 of FIG. 3) and include the additional modules of the apparatus 2204.

As discussed supra, the component 198 may be configured to receive a ranging message. The component 198 may be configured to calculate a CFO based on the ranging message. The component 198 may be configured to transmit a response message including control information to modify a transmission protocol. The transmission of the response message may be in response to the calculated CFO being greater than or equal to a threshold value. The component 198 may be within the cellular baseband processor(s) 2224, the application processor(s) 2206, or both the cellular baseband processor(s) 2224 and the application processor(s) 2206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2204 may include a variety of components configured for various functions. In one configuration, the apparatus 2204, and in particular the cellular baseband processor(s) 2224 and/or the application processor(s) 2206, may include means for receiving a ranging message. The apparatus 2204 may include means for calculating a CFO based on the ranging message. The apparatus 2204 may include means for transmitting a response message including control information to modify a transmission protocol. The transmission of the response message may be in response to the calculated CFO being greater than or equal to a threshold value. The control information may include a set of frequency offsets. The apparatus 2204 may include means for calculating the set of frequency offsets based on a pseudo-random number generator. The apparatus 2204 may include means for receiving a second ranging message based on the set of frequency offsets. The second ranging message may include a plurality of preamble symbols. Each of the plurality of preamble symbols may correspond with a different frequency offset of the set of frequency offsets. The control information may include an indicator of a set of guard periods. The apparatus 2204 may include means for receiving the second ranging message by receiving the second ranging message further based on the set of guard periods. The apparatus 2204 may include means for calculating a set of CFOs based on the second ranging message and the set of frequency offsets. Each of the set of CFOs may correspond with one of the plurality of preamble symbols. The apparatus 2204 may include means for processing a first subset of the plurality of preamble symbols corresponding with a first calculated CFO less than or equal to the threshold value. The apparatus 2204 may include means for skipping or refraining from processing a second subset of the plurality of preamble symbols corresponding with a second calculated CFO greater than or equal to the threshold value. The control information may include a set of code indices. The apparatus 2204 may include means for calculating the set of code indices based on a pseudo-random number generator. The apparatus 2204 may include means for receiving a second ranging message based on the set of code indices. The apparatus 2204 may include means for disregarding a ranging message that is not based on the set of code indices. The second ranging message may include a plurality of sets of preamble symbols. Each of the plurality of sets of preamble symbols may correspond with a different code index of the set of code indices. Each code index of the set of code indices may include a tuple including (a) a first indicator of a start of an index, (b) a second indicator of an end of the index, and (c) a third indicator of a code to use between the start and the end of the index. The control information may include an indicator to modify the transmission protocol. The apparatus 2204 may include means for receiving a second ranging message including second control information. The second control information may include a set of code indices. The apparatus 2204 may include means for transmitting a second response message based on the set of code indices. The second response message may include a plurality of sets of preamble symbols. The apparatus 2204 may include means for transmitting the second response message based on the set of code indices by transmitting each of the plurality of sets of preamble symbols based on a different code index of the set of code indices. Each code index of the set of code indices may include a tuple including (a) a first indicator of a start of an index, (b) a second indicator of an end of the index, and (c) a third indicator of a code. The apparatus 2204 may include means for transmitting each of the plurality of sets of preamble symbols based on the different code index of the set of code indices by transmitting each of the plurality of sets of preamble symbols between the start and the end of the index based on the code. The apparatus 2204 may include means for transmitting the response message further in response to the calculated CFO being greater than or equal to the threshold value a second threshold number of times. The apparatus 2204 may include means for transmitting a first RIM to initiate a positioning session. The ranging message may include an RRM. The apparatus 2204 may include means for receiving the RRM in response to transmitting the RIM. The ranging message may include at least one of an RIM or an RRM. The response message may include at least one of an RCUM or an RRM. The means may be the component 198 of the apparatus 2204 configured to perform the functions recited by the means. As described supra, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the component 199 may be configured to transmit a first ranging message. The component 199 may be configured to receive a response message including control information to modify a transmission protocol after the transmission of the first ranging message. The component 199 may be configured to transmit a second ranging message based on the control information. The component 199 may be within the cellular baseband processor(s) 2224, the application processor(s) 2206, or both the cellular baseband processor(s) 2224 and the application processor(s) 2206. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2204 may include a variety of components configured for various functions. In one configuration, the apparatus 2204, and in particular the cellular baseband processor(s) 2224 and/or the application processor(s) 2206, may include means for transmitting a first ranging message. The apparatus 2204 may include means for receiving a response message including control information to modify a transmission protocol after the transmission of the first ranging message. The apparatus 2204 may include means for transmitting a second ranging message based on the control information. The control information may include a set of frequency offsets. The apparatus 2204 may include means for transmitting the second ranging message based on the control information by transmitting the second ranging message based on the set of frequency offsets. The second ranging message may include a plurality of preamble symbols. The apparatus 2204 may include means for transmitting the second ranging message based on the set of frequency offsets by transmitting each of the plurality of preamble symbols based on a different frequency offset of the set of frequency offsets. The second ranging message may include a plurality of preamble symbols. The control information may include an indicator of a set of guard periods. The apparatus 2204 may include means for transmitting the second ranging message based on the control information by padding each of the plurality of preamble symbols based on the set of guard periods. The control information may include a set of code indices. The apparatus 2204 may include means for transmitting the second ranging message based on the control information by transmitting the second ranging message based on the set of code indices. The second ranging message may include a plurality of sets of preamble symbols. The apparatus 2204 may include means for transmitting the second ranging message based on the set of code indices by transmitting each of the plurality of sets of preamble symbols based on a different code index of the set of code indices. Each code index of the set of code indices may include a tuple including (a) a first indicator of a start of an index, (b) a second indicator of an end of the index, (c) and a third indicator of a code. The apparatus 2204 may include means for transmitting each of the plurality of sets of preamble symbols based on the different code index of the set of code indices by transmitting each of the plurality of sets of preamble symbols between the start and the end of the index based on the code. The control information may include an indicator to modify the transmission protocol. The apparatus 2204 may include means for transmitting the second ranging message based on the control information by transmitting the second ranging message including a set of code indices in response to the reception of the indicator to modify the transmission protocol. The apparatus 2204 may include means for calculating the set of code indices based on a pseudo-random number generator. The apparatus 2204 may include means for receiving a second response message based on the set of code indices. The second response message may include a plurality of sets of preamble symbols. Each of the plurality of sets of preamble symbols may correspond with a different code index of the set of code indices. Each code index of the set of code indices may include a tuple including (a) a first indicator of a start of an index, (b) a second indicator of an end of the index, and (c) a third indicator of a code to use between the start and the end of the index. The first ranging message may include an RIM. The response message may include an RRM. The first ranging message may include at least one of an RIM or an RRM. The response message may include at least one of an RCUM or an RRM. The means may be the component 199 of the apparatus 2204 configured to perform the functions recited by the means. As described supra, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a component of the device that transmits the data. A device configured to "obtain" data, such as a transmission, signal, or message, may receive, for example with a transceiver, or may obtain the data from a component of the device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: receiving a ranging message; calculating a carrier frequency offset (CFO) based on the ranging message; and transmitting a response message comprising control information to modify a transmission protocol, wherein the transmission of the response message is in response to the calculated CFO being greater than or equal to a threshold value.

Aspect 2 is the method of aspect 1, wherein the control information comprises a set of frequency offsets.

Aspect 3 is the method of aspect 2, further comprising calculating the set of frequency offsets based on a pseudo-random number generator.

Aspect 4 is the method of either of aspects 2 or 3, further comprising receiving a second ranging message based on the set of frequency offsets.

Aspect 5 is the method of aspect 4, wherein the second ranging message comprises a plurality of preamble symbols, wherein each of the plurality of preamble symbols corresponds with a different frequency offset of the set of frequency offsets.

Aspect 6 is the method of aspect 5, wherein the control information comprises an indicator of a set of guard periods, wherein receiving the second ranging message comprises receiving the second ranging message further based on the set of guard periods.

Aspect 7 is the method of either of aspects 5 or 6, further comprising: calculating a set of CFOs based on the second ranging message and the set of frequency offsets, wherein each of the set of CFOs corresponds with one of the plurality of preamble symbols; processing a first subset of the plurality of preamble symbols corresponding with a first calculated CFO less than or equal to the threshold value; and skipping or refraining from processing a second subset of the plurality of preamble symbols corresponding with a second calculated CFO greater than or equal to the threshold value.

Aspect 8 is the method of any of aspects 1 to 7, wherein the control information comprises a set of code indices.

Aspect 9 is the method of aspect 8, further comprising calculating the set of code indices based on a pseudo-random number generator.

Aspect 10 is the method of either of aspects 8 or 9, further comprising: receiving a second ranging message based on the set of code indices; and disregarding a ranging message that is not based on the set of code indices.

Aspect 11 is the method of aspect 10, wherein the second ranging message comprises a plurality of sets of preamble symbols, wherein each of the plurality of sets of preamble symbols corresponds with a different code index of the set of code indices.

Aspect 12 is the method of any of aspects 8 to 11, wherein each code index of the set of code indices comprises a tuple comprising: a first indicator of a start of an index; a second indicator of an end of the index; and a third indicator of a code to use between the start and the end of the index.

Aspect 13 is the method of any of aspects 1 to 12, wherein the control information comprises an indicator to modify the transmission protocol, further comprising: receiving a second ranging message comprising second control information, wherein the second control information comprises a set of code indices; and transmitting a second response message based on the set of code indices.

Aspect 14 is the method of aspect 13, wherein the second response message comprises a plurality of sets of preamble symbols, wherein transmitting the second response message based on the set of code indices comprises transmitting each of the plurality of sets of preamble symbols based on a different code index of the set of code indices.

Aspect 15 is the method of aspect 14, wherein each code index of the set of code indices comprises a tuple comprising: a first indicator of a start of an index; a second indicator of an end of the index; and a third indicator of a code, wherein transmitting each of the plurality of sets of preamble symbols based on the different code index of the set of code indices comprises transmitting each of the plurality of sets of preamble symbols between the start and the end of the index based on the code.

Aspect 16 is the method of any of aspects 1 to 15, wherein the transmission of the response message is further in response to the calculated CFO being greater than or equal to the threshold value a second threshold number of times.

Aspect 17 is the method of any of aspects 1 to 16, further comprising: transmitting a first ranging initiation message (RIM) to initiate a positioning session, wherein the ranging message comprises a ranging response message (RRM), wherein the reception of the RRM is in response to the transmission of the RIM.

Aspect 18 is the method of any of aspects 1 to 17, wherein the ranging message comprises at least one of a ranging initiation message (RIM) or a ranging response message (RRM).

Aspect 19 is the method of any of aspects 1 to 18, wherein the response message comprises at least one of a ranging control update message (RCUM) or a ranging response message (RRM).

Aspect 20 is a method of wireless communication at a user equipment (UE), comprising: transmitting a first ranging message; receiving a response message comprising control information to modify a transmission protocol after the transmission of the first ranging message; and transmitting a second ranging message based on the control information.

Aspect 21 is the method of aspect 20, wherein the control information comprises a set of frequency offsets, wherein transmitting the second ranging message based on the control information comprises transmitting the second ranging message based on the set of frequency offsets.

Aspect 22 is the method of aspect 21, wherein the second ranging message comprises a plurality of preamble symbols, wherein transmitting the second ranging message based on the set of frequency offsets comprises transmitting each of the plurality of preamble symbols based on a different frequency offset of the set of frequency offsets.

Aspect 23 is the method of any of aspects 20 to 22, wherein the second ranging message comprises a plurality of preamble symbols, wherein the control information comprises an indicator of a set of guard periods, wherein transmitting the second ranging message based on the control information further comprises padding each of the plurality of preamble symbols based on the set of guard periods.

Aspect 24 is the method of any of aspects 20 to 23, wherein the control information comprises a set of code indices, wherein transmitting the second ranging message based on the control information comprises transmitting the second ranging message based on the set of code indices.

Aspect 25 is the method of aspect 24, wherein the second ranging message comprises a plurality of sets of preamble symbols, wherein transmitting the second ranging message based on the set of code indices comprises transmitting each of the plurality of sets of preamble symbols based on a different code index of the set of code indices.

Aspect 26 is the method of aspect 25, wherein each code index of the set of code indices comprises a tuple comprising: a first indicator of a start of an index; a second indicator of an end of the index; and a third indicator of a code, wherein transmitting each of the plurality of sets of preamble symbols based on the different code index of the set of code indices comprises transmitting each of the plurality of sets of preamble symbols between the start and the end of the index based on the code.

Aspect 27 is the method of any of aspects 20 to 26, wherein the control information comprises an indicator to modify the transmission protocol, wherein transmitting the second ranging message based on the control information comprises transmitting the second ranging message comprising a set of code indices in response to the reception of the indicator to modify the transmission protocol.

Aspect 28 is the method of aspect 27, further comprising calculating the set of code indices based on a pseudo-random number generator.

Aspect 29 is the method of aspect 28, further comprising receiving a second response message based on the set of code indices.

Aspect 30 is the method of aspect 29, wherein the second response message comprises a plurality of sets of preamble symbols, wherein each of the plurality of sets of preamble symbols corresponds with a different code index of the set of code indices.

Aspect 31 is the method of any of aspects 27 to 30, wherein each code index of the set of code indices comprises a tuple comprising: a first indicator of a start of an index; a second indicator of an end of the index; and a third indicator of a code to use between the start and the end of the index.

Aspect 32 is the method of any of aspects 20 to 31, wherein the first ranging message comprises a ranging initiation message (RIM), wherein the response message comprises a ranging response message (RRM).

Aspect 33 is the method of any of aspects 20 to 32, wherein the first ranging message comprises at least one of a ranging initiation message (RIM) or a ranging response message (RRM).

Aspect 34 is the method of any of aspects 20 to 33, wherein the response message comprises at least one of a ranging control update message (RCUM) or a ranging response message (RRM).

Aspect 35 is an apparatus for wireless, communication: at least one memory; and at least one processor coupled to the at least one memory and, based at least in part on information stored in the at least one memory, the at least one processor, individually or in any combination, is configured to perform the method of any of aspects 1 to 34.

Aspect 36 is an apparatus for wireless, comprising means for performing each step in the method of any of aspects 1 to 34.

Aspect 37 is the apparatus of any of aspects 1 to 34, further comprising a transceiver (e.g., a transceiver coupled to the at least one processor in Aspect 35) configured to receive or to transmit in association with the method of any of aspects 1 to 34.

Aspect 38 is a computer-readable medium (e.g., a non-transitory computer-readable medium) storing computer executable code, the code when executed by at least one processor causes the at least one processor to perform the method of any of aspects 1 to 34.

What is claimed is:

1. An apparatus for wireless communication at a user equipment (UE), comprising:
- at least one memory; and
- at least one processor coupled to the at least one memory and, based at least in part on information stored in the at least one memory, the at least one processor is configured to:
  - receive a ranging message;
  - calculate a carrier frequency offset (CFO) based on the ranging message; and
  - transmit a response message comprising control information to modify a transmission protocol, wherein the transmission of the response message is in response to the calculated CFO being greater than or equal to a threshold value, wherein the control information comprises an indicator of a set of frequency offsets or a set of code indices.

2. The apparatus of claim 1, wherein the at least one processor is further configured to:
- calculate the set of frequency offsets based on a pseudo-random number generator.

3. The apparatus of claim 1, wherein the at least one processor is further configured to:
- receive a second ranging message based on the set of frequency offsets.

4. The apparatus of claim 3, wherein the second ranging message comprises a plurality of preamble symbols, wherein each of the plurality of preamble symbols corresponds with a different frequency offset of the set of frequency offsets.

5. The apparatus of claim 4, wherein the control information comprises an indicator of a set of guard periods, wherein, to receive the second ranging message, the at least one processor is configured to:
- receive the second ranging message further based on the set of guard periods.

6. The apparatus of claim 4, wherein the at least one processor is further configured to:
- calculate a set of CFOs based on the second ranging message and the set of frequency offsets, wherein each of the set of CFOs corresponds with one of the plurality of preamble symbols;
- process a first subset of the plurality of preamble symbols corresponding with a first calculated CFO less than or equal to the threshold value; and
- refrain from processing a second subset of the plurality of preamble symbols corresponding with a second calculated CFO greater than or equal to the threshold value.

7. The apparatus of claim 1, wherein the at least one processor is further configured to:
- calculate the set of code indices based on a pseudo-random number generator.

8. The apparatus of claim 1, wherein the at least one processor is further configured to:
- receive a second ranging message based on the set of code indices; and
- disregard at least one of the ranging message or the second ranging message that is not based on the set of code indices.

9. The apparatus of claim 8, wherein the second ranging message comprises a plurality of sets of preamble symbols, wherein each of the plurality of sets of preamble symbols corresponds with a different code index of the set of code indices.

10. The apparatus of claim 1, wherein each code index of the set of code indices comprises a tuple comprising:
- a first indicator of a start of an index;
- a second indicator of an end of the index; and
- a third indicator of a code to use between the start and the end of the index.

11. The apparatus of claim 1, wherein the control information comprises an indicator to modify the transmission protocol, wherein the at least one processor is further configured to:
- receive a second ranging message comprising second control information, wherein the second control information comprises the set of code indices; and
- transmit a second response message based on the set of code indices.

12. The apparatus of claim 11, wherein the second response message comprises a plurality of sets of preamble symbols, wherein, to transmit the second response message based on the set of code indices, the at least one processor is configured to:
- transmit each of the plurality of sets of preamble symbols based on a different code index of the set of code indices.

13. The apparatus of claim 12, wherein each code index of the set of code indices comprises a tuple comprising:
- a first indicator of a start of an index;
- a second indicator of an end of the index; and
- a third indicator of a code, wherein, to transmit each of the plurality of sets of preamble symbols based on the different code index of the set of code indices, the at least one processor is configured to:
  - transmit each of the plurality of sets of preamble symbols between the start and the end of the index based on the code.

14. The apparatus of claim 1, wherein the transmission of the response message is further in response to the calculated CFO being greater than or equal to the threshold value a second threshold number of times.

15. The apparatus of claim 1, further comprising a transceiver coupled to the at least one processor, wherein the at least one processor is further configured to:
- transmit, via the transceiver, a first ranging initiation message (RIM) to initiate a positioning session, wherein the ranging message comprises a ranging response message (RRM), wherein the reception of the RRM is in response to the transmission of the RIM.

16. The apparatus of claim 1, wherein the ranging message comprises at least one of a ranging initiation message (RIM) or a ranging response message (RRM).

17. The apparatus of claim 1, wherein the response message comprises at least one of a ranging control update message (RCUM) or a ranging response message (RRM).

18. An apparatus for wireless communication at a user equipment (UE), comprising:

at least one memory; and at least one processor coupled to the at least one memory and, based at least in part on information stored in the at least one memory, the at least one processor is configured to:

transmit a first ranging message;

receive a response message comprising control information to modify a transmission protocol after the transmission of the first ranging message, wherein the control information comprises an indicator of a set of frequency offsets or a set of code indices; and transmit a second ranging message based on the indicator of the set of frequency offsets or the set of code indices.

19. The apparatus of claim 18, wherein the second ranging message comprises a plurality of preamble symbols, wherein, to transmit the second ranging message based on the set of frequency offsets or the set of code indices, the at least one processor is configured to:

transmit each of the plurality of preamble symbols based on a different frequency offset of the set of frequency offsets.

20. The apparatus of claim 18, wherein the second ranging message comprises a plurality of preamble symbols, wherein the control information comprises an indicator of a set of guard periods, wherein, to transmit the second ranging message based on the set of frequency offsets or the set of code indices, the at least one processor is configured to:

pad each of the plurality of preamble symbols based on the set of guard periods.

21. The apparatus of claim 18, wherein, to transmit the second ranging message based on the set of frequency offsets or the set of code indices, the at least one processor is configured to:

transmit the second ranging message based on the set of code indices.

22. The apparatus of claim 21, wherein the second ranging message comprises a plurality of sets of preamble symbols, wherein, to transmit the second ranging message based on the set of code indices, the at least one processor is configured to:

transmit each of the plurality of sets of preamble symbols based on a different code index of the set of code indices.

23. The apparatus of claim 22, further comprising a transceiver coupled to the at least one processor, wherein each code index of the set of code indices comprises a tuple comprising:

a first indicator of a start of an index;

a second indicator of an end of the index; and a third indicator of a code, wherein, to transmit each of the plurality of sets of preamble symbols based on the different code index of the set of code indices, the at least one processor is configured to:

transmit, via the transceiver, each of the plurality of sets of preamble symbols between the start and the end of the index based on the code.

24. The apparatus of claim 18, wherein the control information comprises an indicator to modify the transmission protocol, wherein, to transmit the second ranging message based on the set of frequency offsets or the set of code indices the at least one processor is configured to:

transmit the second ranging message comprising the set of code indices in response to the reception of the indicator to modify the transmission protocol, wherein the at least one processor is further configured to;

calculate the set of code indices based on a pseudo-random number generator; and receive a second response message based on the set of code indices.

25. The apparatus of claim 24, wherein the second response message comprises a plurality of sets of preamble symbols, wherein each of the plurality of sets of preamble symbols corresponds with a different code index of the set of code indices.

26. The apparatus of claim 24, wherein each code index of the set of code indices comprises a tuple comprising:

a first indicator of a start of an index;

a second indicator of an end of the index; and a third indicator of a code to use between the start and the end of the index.

27. A method of wireless communication at a user equipment (UE), comprising:

receiving a ranging message;

calculating a carrier frequency offset (CFO) based on the ranging message; and transmitting a response message comprising control information to modify a transmission protocol, wherein the transmission of the response message is in response to the calculated CFO being greater than or equal to a threshold value, wherein the control information comprises an indicator of a set of frequency offsets or a set of code indices.

28. A method of wireless communication at a user equipment (UE), comprising:

transmitting a first ranging message;

receiving a response message comprising control information to modify a transmission protocol after the transmission of the first ranging message, wherein the control information comprises an indicator of a set of frequency offsets or a set of code indices; and transmitting a second ranging message based on the indicator of the set of frequency offsets or the set of code indices.

* * * * *